(12) United States Patent
Hattori

(10) Patent No.: US 7,382,932 B2
(45) Date of Patent: Jun. 3, 2008

(54) IMAGE PROCESSING APPARATUS AND METHOD, AND COMPUTER PROGRAM AND COMPUTER-READABLE STORAGE MEDIUM

(75) Inventor: Hideaki Hattori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 10/988,567

(22) Filed: Nov. 16, 2004

(65) Prior Publication Data
US 2005/0111542 A1    May 26, 2005

(30) Foreign Application Priority Data
Nov. 20, 2003    (JP)    ............... 2003-390752

(51) Int. Cl.
*G06K 9/40*    (2006.01)
(52) U.S. Cl. ...................................... 382/275; 382/232
(58) Field of Classification Search ............... 358/3.26; 382/275, 232; 702/69
See application file for complete search history.

(56) References Cited

U.S. PATENT DOCUMENTS 5,553,164 A    9/1996    Itagaki .................. 382/232
5,590,222 A *  12/1996   Kojima ................. 382/268
5,949,917 A *   9/1999   Kawasaka .............. 382/268

FOREIGN PATENT DOCUMENTS

| JP | 5-219384 | | 8/1993 |
| JP | 7-038762 | | 2/1995 |
| JP | 07038762 A | * | 2/1995 |
| JP | 2003-018600 | | 1/2003 |

* cited by examiner

*Primary Examiner*—Matthew C. Bella
*Assistant Examiner*—G. F. Cunningham
(74) *Attorney, Agent, or Firm*—Fitzpatrick, Cella, Harper & Scinto

(57) ABSTRACT

This invention obtains information required to quantitatively evaluate block distortion of an image on the basis of encoded data that utilizes the compression encoding technique for respective blocks. To this end, a compression encoding unit (106) compression-encodes an image input from an image input unit (104) in accordance with an encoding parameter input from an encoding parameter input unit (107). A decoding unit (108) generates a decoded image by decoding the compression-encoded data. A spatial differentiator (101) in a block distortion evaluator (100) makes a spatial derivative calculation of the original image data, and a spatial differentiator (102) makes a spatial derivative calculation of the decoded image. An evaluation information calculator (103) generates block distortion index information on the basis of these two derivative calculation results.

14 Claims, 20 Drawing Sheets

FIG. 8

| 2 | 2 | 2 | 2 | 2 | 2 | 2 | 2 |
|---|---|---|---|---|---|---|---|
| 2 | 3 | 3 | 3 | 3 | 3 | 3 | 2 |
| 2 | 3 | 4 | 4 | 4 | 4 | 3 | 2 |
| 2 | 3 | 4 | 4 | 4 | 4 | 3 | 2 |
| 2 | 3 | 4 | 4 | 4 | 4 | 3 | 2 |
| 2 | 3 | 4 | 4 | 4 | 4 | 3 | 2 |
| 2 | 3 | 3 | 3 | 3 | 3 | 3 | 2 |
| 2 | 2 | 2 | 2 | 2 | 2 | 2 | 2 |

FIG. 12

| X(i-2,j+2) | X(i-1,j+2) | X(i,j+2) | X(i+1,j+2) | X(i+2,j+2) |
| X(i-2,j+1) | X(i-1,j+1) | X(i,j+1) | X(i+1,j+1) | X(i+2,j+1) |
| X(i-2,j) | X(i-1,j) | X(i,j) | X(i+1,j) | X(i+2,j) |
| X(i-2,j-1) | X(i-1,j-1) | X(i,j-1) | X(i+1,j-1) | X(i+2,j-1) |
| X(i-2,j-2) | X(i-1,j-2) | X(i,j-2) | X(i+1,j-2) | X(i+2,j-2) |

MAIN SCAN (HORIZONTAL) DIRECTION →

SUB-SCAN (VERTICAL) DIRECTION →

IMAGE PROCESSING APPARATUS AND METHOD, AND COMPUTER PROGRAM AND COMPUTER-READABLE STORAGE MEDIUM

FIELD OF THE INVENTION

The present invention relates to image quality evaluation and image quality improvement techniques when an image encoding scheme that segments a still image or moving image into a plurality of blocks, and applies an encoding process for respective blocks is used.

BACKGROUND OF THE INVENTION

In order to effectively use digital images, they must be efficiently stored and transferred, and compression encoding of image data is an indispensable technique. As a method of compressing image data, a method of segmenting image data to be compressed into blocks, generating a difference signal by inter-frame prediction using motion compensation as needed in case of a moving image, and transforming blocks into orthogonal transformation coefficients (to be referred to as DCT coefficients hereinafter) using orthogonal transformation such as discrete cosine transformation (to be referred to as DCT hereinafter) to attain entropy encoding is generally known (e.g., JPEG (Joint Photographic Experts Group) and MPEG (Motion Picture Experts Group) as standard image encoding methods). This method positively utilizes the correlation of an image, i.e., the concentrated distribution of an image signal with strong correlation in a low-frequency range upon orthogonal transformation.

For example, in JPEG and MPEG, an original image is normally segmented into 8×8 pixel blocks, and two-dimensional (2D) DCTs are computed for respective blocks. In order to reduce the code size, DCT coefficients are quantized using a quantization table and quantization scale value. In this case, in consideration of the human visual characteristics, visually sensitive low-frequency components are quantized using a small quantization table value, and insensitive high-frequency components are quantized using a large quantization table value, thus achieving efficient quantization that suffers less visual deterioration to obtain DCT coefficients that have been quantized (to be referred to as quantized DCT coefficients hereinafter). In order to make the code size of an image to be output fall within a predetermined range, a method of quantizing using a quantization scale value that changes according to the current bit rate or total code size is generally used.

When a high-resolution moving image or still image is stored in a storage device with a limited capacity such as a flash memory or the like for a long period of time (a large number of images in case of a still image), the bit rate as a data size per unit time must be lowered by increasing the compression ratio.

As a method of lowering the bit rate, a method of increasing quantized DCT coefficients that assume zero by increasing a quantization scale value is generally used. With this quantization process, more efficient compression can be attained in entropy encoding.

However, since DCT coefficients that have undergone frequency transformation for respective blocks are quantized, if coarse quantization is made by increasing a quantization scale value, serious distortion, i.e., so-called block distortion, is produced at block boundaries, resulting in conspicuous image quality deterioration. As a method of eliminating such block distortion, a method using a filter such as a low-pass filter (to be referred to as an LPF hereinafter) or the like is generally used. When the LPF is applied to the output from a decoder, this block distortion can be effectively eliminated. However, such process in the decoder deviates from the contents of the image encoding international standards such as JPEG, MPEG, and the like, and can be implemented by only a specific decoder. Assuming that processes are done by a decoder which is implemented by general software complying with the image encoding international standards such as JPEG, MPEG, and the like, another process for suppressing production of any block distortion must be done in the encoder.

As means for suppressing production of any block distortion in the encoder, a method of adaptively changing a quantization parameter, and a method of changing the filter characteristics of a filter processor in an image processing unit located on the input side of encoding are generally used.

As the method of adaptively changing a quantization parameter, a method of suppressing production of block distortion while realizing a desired bit rate by detecting block distortion in one image, decreasing a quantization scale value of a region that suffers block distortion, and increasing a quantization scale value of a region that suffers less block distortion is generally used. When the quantization parameter is changed in this way, block distortion must be accurately detected. If a detection error has occurred, block distortion may increase unwantedly.

When the filter processor in the image processing unit which is located on the input side of an encoder is used to eliminate block distortion, an LPF is normally used as a filter. This is because block distortion normally includes many high-frequency components, and high-frequency components at which block distortion is produced are reduced in advance using the LPF. At the same time, quantized DCT coefficients with nonzero high-frequency components can be reduced, and the encoding efficiency of entropy encoding can be improved. In this way, using the LPF, block distortion of a decoded image can be eliminated.

As problems posed when the LPF is used in an encoder, if the LPF is applied when no block distortion is produced, a problem of unsharp image quality since high-frequency components of an original image are cut off, and a problem of image quality deterioration compared to a case without any filter process since the boundary lacks smoothness at the edge of an object, i.e., so-called mosquito noise is produced are posed.

For these reasons, in order to minimize image quality deterioration at a low bit rate, image deterioration due to block distortion must undergo accurate quantitative evaluation, and a quantization parameter and filter characteristics must be adaptively determined based on the evaluation result.

As a first conventional method of a block distortion detection method, a method of predicting appearance of block distortion or the like based on a quantization parameter upon encoding is known (e.g., Japanese Patent Laid-Open No. 2003-018600). As a second conventional method, a method of detecting block distortion by comparing a difference value between neighboring pixels in a block with that between neighboring pixels at a block boundary in a decoded image in a post-process filter control method in a video codec is known (e.g., Japanese Patent Laid-Open No. 7-38762). As a third conventional method, an error between an original image and decoded image is calculated, and if the error is equal to or smaller than a given threshold value, it is determined to be zero. If the error is equal to or larger than a given value, a difference value between neighboring pixels is calculated at a block boundary, and the square mean of the differences for the length of a block side is calculated for each block boundary. In consideration of the human visual characteristics, the ratio between the square mean and the variance of luminance values in a block is used as a quantitative evaluation scale of block distortion in each block (e.g., Japanese Patent Laid-Open No. 5-219384).

However, in the first conventional method, since block distortion has different values depending on target images, it is difficult to accurately predict the relationship between the quantization scale value and production of block distortion. Hence, when production of block distortion is predicted based on the quantization scale value, a prediction error occurs. If such prediction error has occurred, image quality may worsen upon changing the quantization parameter or filter characteristics.

In the second conventional method, since block distortion is detected based on only the decoded image, if the block boundary matches an object edge, the object edge is erroneously detected as block distortion although no block distortion is produced.

In the third conventional method, since block distortion is detected based on only block boundary values, it is difficult to determine whether the entire frame suffers deterioration or block distortion is conspicuously produced only at the block boundary. Since the square mean is calculated, and the ratio to the luminance variance in a block is calculated, complicated calculations are required, and hardware implementation is difficult.

SUMMARY OF THE INVENTION

The present invention has been made in consideration of the aforementioned problems, and has as its object to provide a technique for generating information used to objectively evaluate block distortion of a decoded image obtained from encoded image data by a simple arrangement.

In order to achieve this object, for example, an image processing apparatus of the present invention comprises the following arrangement.

An image processing apparatus for generating information required to evaluate image quality of a decoded image expressed by code data, which is obtained by compression-encoding original image data based on a set encoding parameter, comprises:

an encoding unit, arranged to compression-encode the original image data in accordance with a given encoding parameter;

a decoding unit, arranged to generate decoded image data by decoding encoded data obtained by the encoding unit;

a first spatial derivative calculation unit, arranged to make a spatial derivative calculation of the original image data;

a second spatial derivative calculation unit, arranged to make a spatial derivative calculation of the decoded image data; and an evaluation information calculation unit, arranged to calculate evaluation information, used as an index of block distortion of the image encoded by the encoding unit, on the basis of results obtained by the first and second spatial derivative calculation units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 shows the relationship between the intra-frame positions of a pixel of interest and the coefficients of a block distortion quantitative evaluation index in the fifth embodiment;

FIG. 12 shows the positional relationship between the pixel of interest and surrounding pixels;

DETAILED DESCRIPTION OF THE PREFERRED EMBODIMENTS

Preferred embodiments of the present invention will be described in detail hereinafter with reference to the accompanying drawings.

Figure 1:
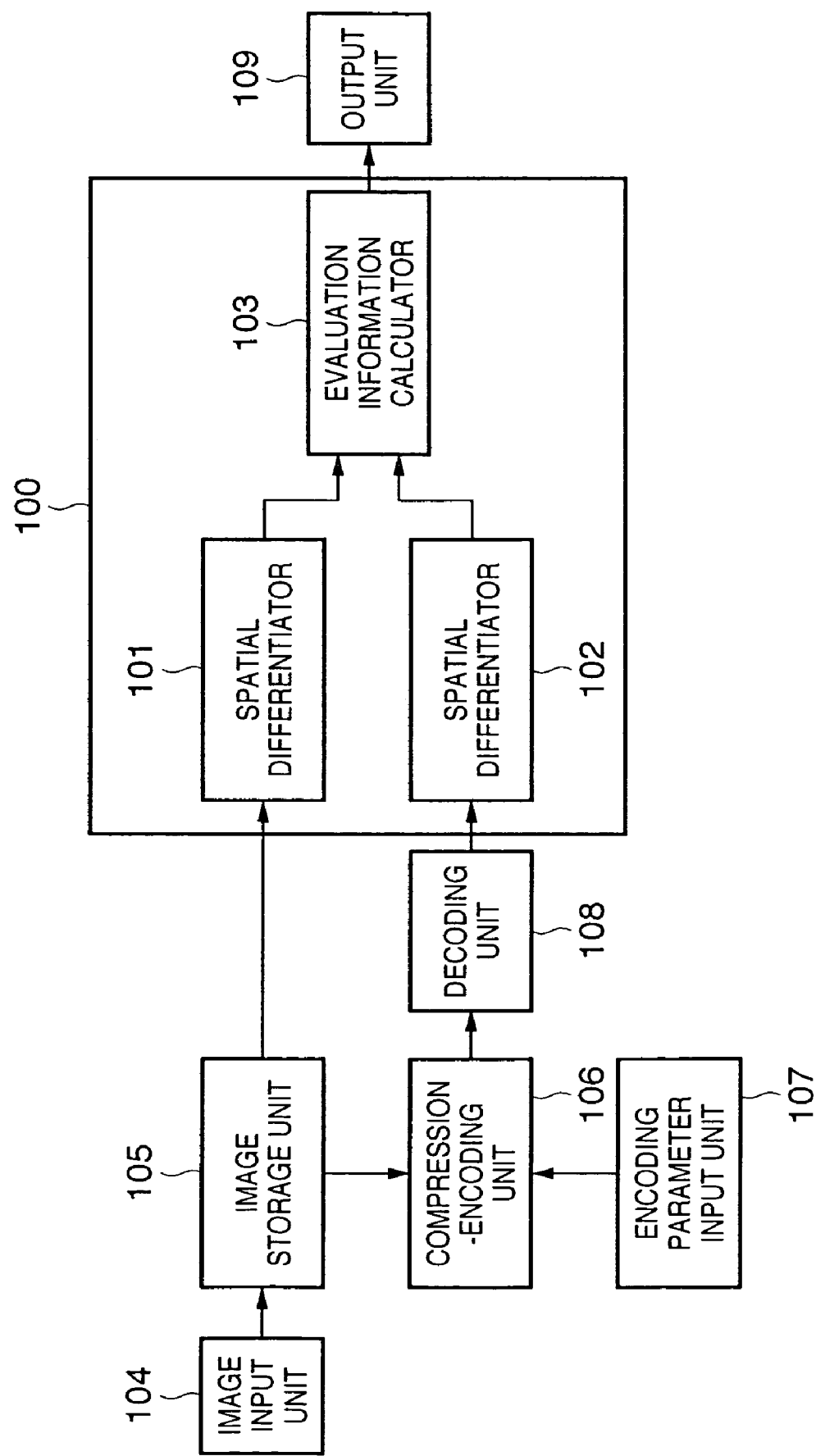
FIG. 1 is a functional block diagram of a block distortion quantitative evaluator according to an embodiment of the present invention.

FIG. 1 is a block diagram of an image processing apparatus according to an embodiment of the present invention.

Referring to FIG. 1, reference numeral 100 denotes a block distortion evaluator as principal part of this embodiment. The block distortion evaluation unit 100 includes spatial differentiators 101 and 102 and evaluation information calculator 103. Reference numeral 104 denotes an image input unit which inputs non-compressed image data from an image scanner, digital camera, or the like. Reference numeral 105 denotes an image storage unit for storing an input original image. Reference numeral 106 denotes a compression encoding unit for compression-encoding original image data stored in the image storage unit 105; and 107, an encoding parameter input unit for inputting encoding parameters used in compression encoding of the compression encoding unit 106. Reference numeral 108 denotes a decoding unit for decoding the compression-encoded data and generating a decoded image. Reference numeral 109 denotes an output unit for outputting information from the block distortion evaluation unit 100.

First Embodiment

In the above arrangement, a method of calculating a quantitative evaluation index of block distortion in the block distortion evaluation unit 100 will be explained below.

In this embodiment, let BND (Blocking Noise Degree) be the quantitative evaluation index of block distortion, and BND_h(i,j) and BND_v(i,j) be the quantitative evaluation indices of block distortion in the horizontal and vertical directions at a main scan (horizontal) pixel position i and sub-scan (vertical) pixel position j (i.e., a pixel position (i,j)) of the pixel of interest in a frame. An original image has luminance and color difference components, and quantitative evaluation of block distortion is made using only luminance component values.

Let X be an original image (an image stored in the image storage unit 105), and Y be an image (decoded image) decoded by the decoding unit 108. Let X(i,j) be the pixel value (luminance component value) of a pixel of interest in the original image X. Then, the original image X has a distribution shown in FIG. 12. The same applies to the decoded image Y.

Horizontal and vertical derivatives X'_h(i,j) and X'_v(i,j) of the original image X, and horizontal and vertical derivatives Y'_h(i,j) and Y'_v(i,j) of the decoded image Y, are calculated by:

$$X'\_h(i,j)=X(i,j)-X(i+1,j)$$

$$X'\_v(i,j)=X(i,j)-X(i,j+1)$$

$$Y'\_h(i,j)=Y(i,j)-Y(i+1,j)$$

$$Y'\_v(i,j)=Y(i,j)-Y(i,j+1) \quad (1)$$

Horizontal and vertical quantitative evaluation index values BND_h(i,j) and BND_v(i,j) are calculated by:

$$BND\_h(i,j)=|X'\_h(i,j)-Y'\_h(i,j)|$$

$$BND\_v(i,j)=|X'\_v(i,j)-Y'\_v(i,j)| \quad (2)$$

The block distortion evaluation unit 100 in the first embodiment, which performs the above processes, calculates the aforementioned quantitative evaluation indices BND_h(i,j) and BND_v(i,j). Hence, the processes of the unit 100 will be described in more detail below.

The spatial differentiator 101 calculates a spatial derivative of the original image X, and the spatial differentiator 102 calculates that of the decoded image Y. However, these two spatial differentiators 101 and 102 are synchronized to calculate the spatial derivatives at the same pixel position. The evaluation information calculator 103 receives derivatives from these two spatial differentiators 101 and 102, and calculates quantitative evaluation indices BND_h(i,j) and BND_v(i,j) of block distortion.

Figure 2:
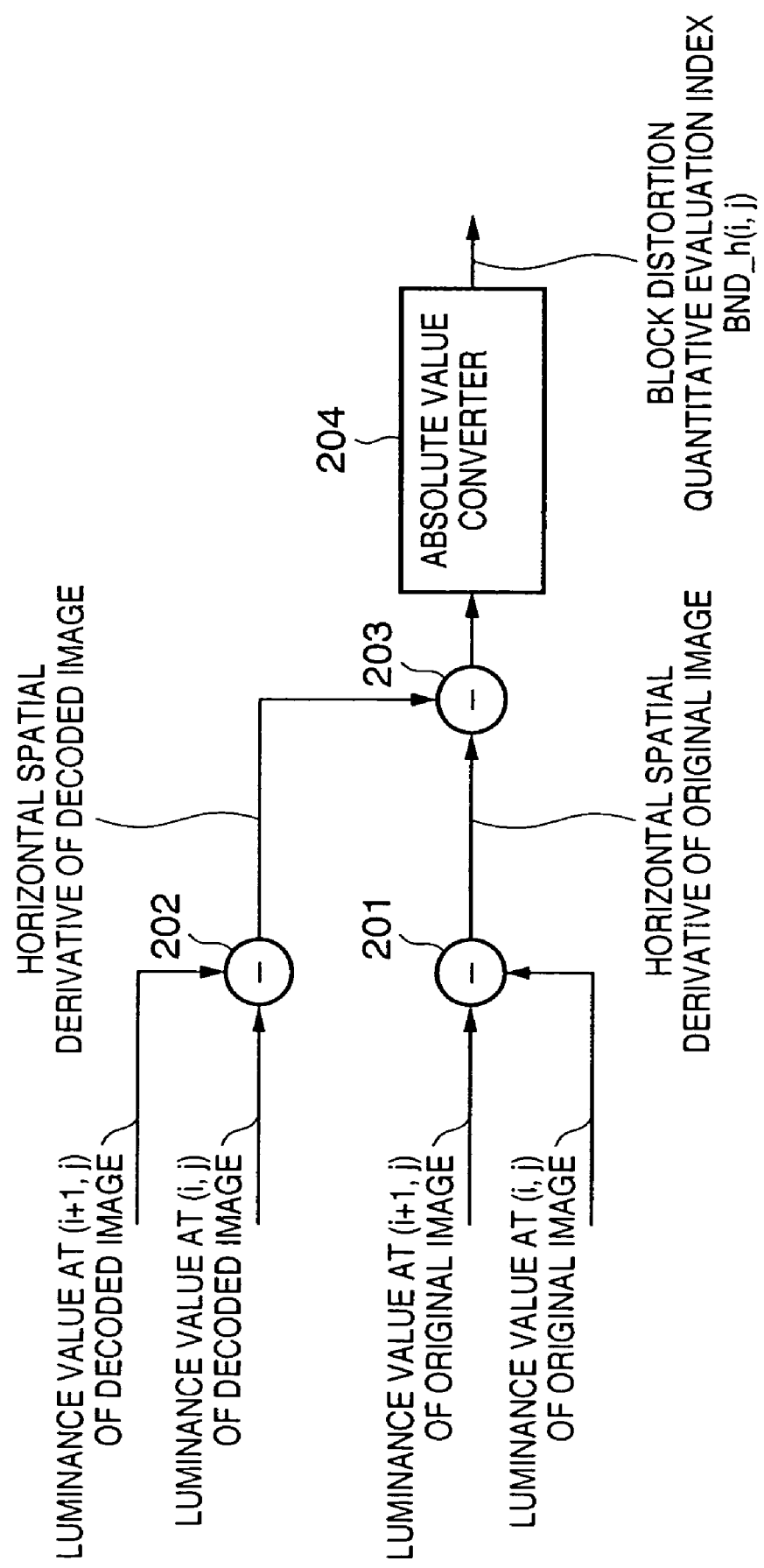
FIG. 2 is a block diagram of a distortion evaluator in the first embodiment.

FIG. 2 shows details of the arrangement of the block distortion evaluation unit 100 shown in FIG. 1. Note that FIG. 2 shows an arrangement for calculating the horizontal quantitative evaluation index BND_h(i,j). Since an arrangement for calculating the vertical quantitative evaluation index BND_v(i,j) is substantially the same as that shown in FIG. 2, except that the input direction of pixels to be input agrees with the vertical direction, and is apparent from the following description, a description thereof will be omitted.

Referring to FIG. 2, a subtractor 201 calculates the difference between two neighboring pixels, i.e., X'_h(i,j) in one horizontal line of the original image X.

On the other hand, a subtractor 202 calculates the difference between two neighboring pixels, i.e., Y'_h(i,j) in one horizontal line of the decoded image Y. A subtractor 203 calculates the difference between the output values from the subtractors 201 and 202 to obtain an error of the horizontal derivatives of the original image X and decoded image Y. This error has a positive/negative sign at that time. Hence, the error is converted into its absolute value by an absolute value converter 204 to obtain the horizontal evaluation index value BND_h(i,j).

As can be understood from the above description, the arrangement shown in FIG. 2 can successfully obtain the horizontal evaluation index value BND_h(i,j) by a very simple arrangement. Likewise, the vertical evaluation index value BND_v(i,j) can be obtained by a simple arrangement as in FIG. 2, although pixels are input from not horizontal lines but vertical columns. Even software can perform very high-speed processing since the process is simple.

An actual encoding process is done using a standard natural image (non-compressed image taken by a digital camera or obtained by scanning a photo by an image scanner), and errors of horizontal spatial derivatives due to encoding are measured. The measurement results are as shown in FIG. 3.

Figure 3:
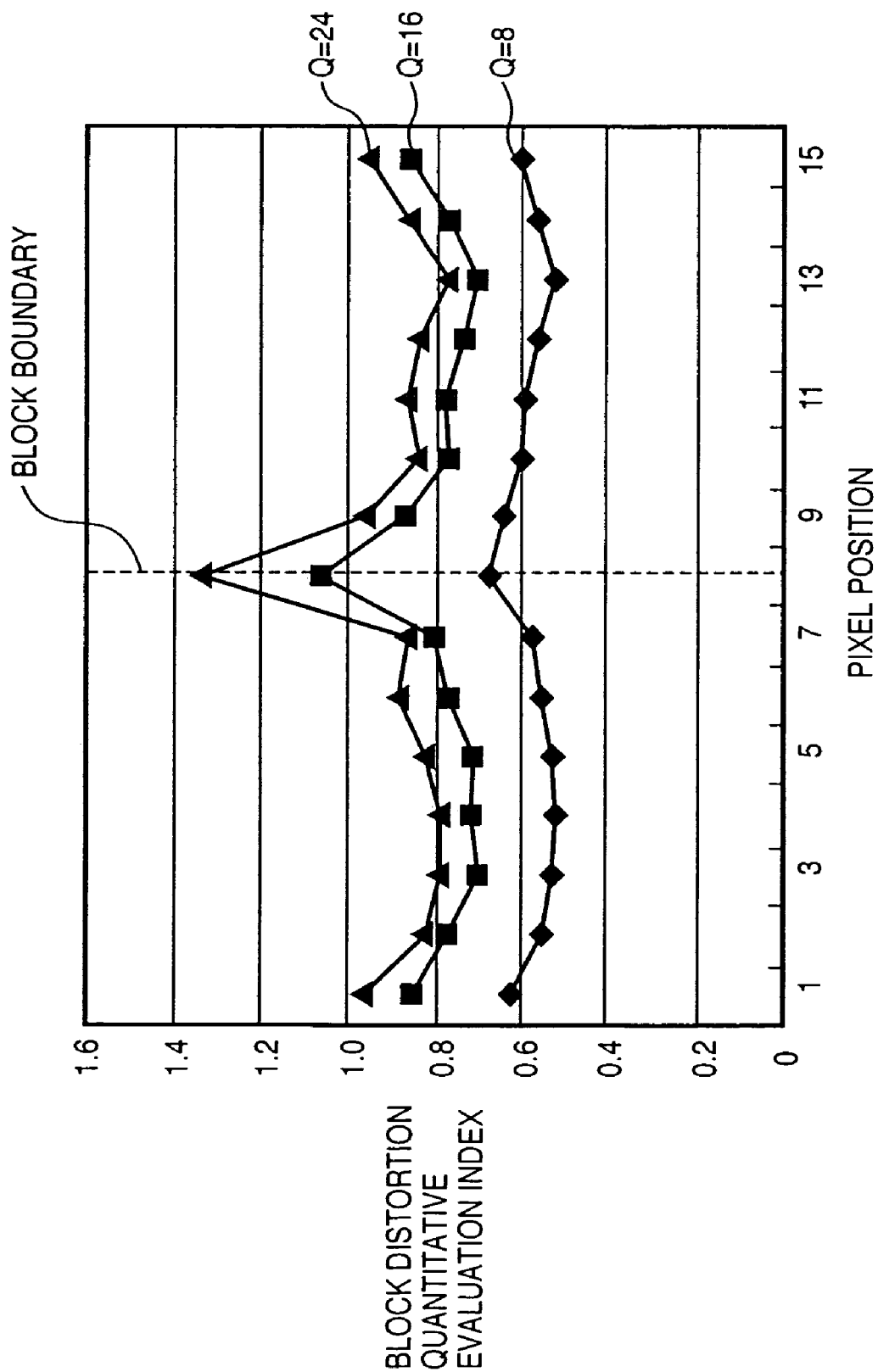
FIG. 3 is a graph showing the relationship between the intra-frame positions and block distortion quantitative evaluation indices in the first embodiment.

FIG. 3 shows the relationship between the horizontal spatial derivative errors and pixel positions when an arbitrary still image is encoded using three different quantization scale values (only a 16×16 macroblock is extracted). In FIG. 3, Q indicates a quantization scale value. Also, the central pixel position (pixel position=8) represents a position where spatial differentiation is done across the block boundary. As can be seen from FIG. 3, when a large quantization scale value is used (Q=24), i.e., when coarse quantization is made and large quantization errors are produced, a spatial derivative error at the block boundary stands out from other values in the block. In such case, conspicuous distortion, i.e., block distortion is present at the block boundary.

The relationship between the quantization scale value and production of block distortion all depends on images (since there are an image that readily causes block distortion and an image that hardly causes it). However, a phenomenon that the spatial derivative error at the block boundary stands out with increasing quantization scale value is also observed in other images that have undergone encoding processes.

Figure 13:
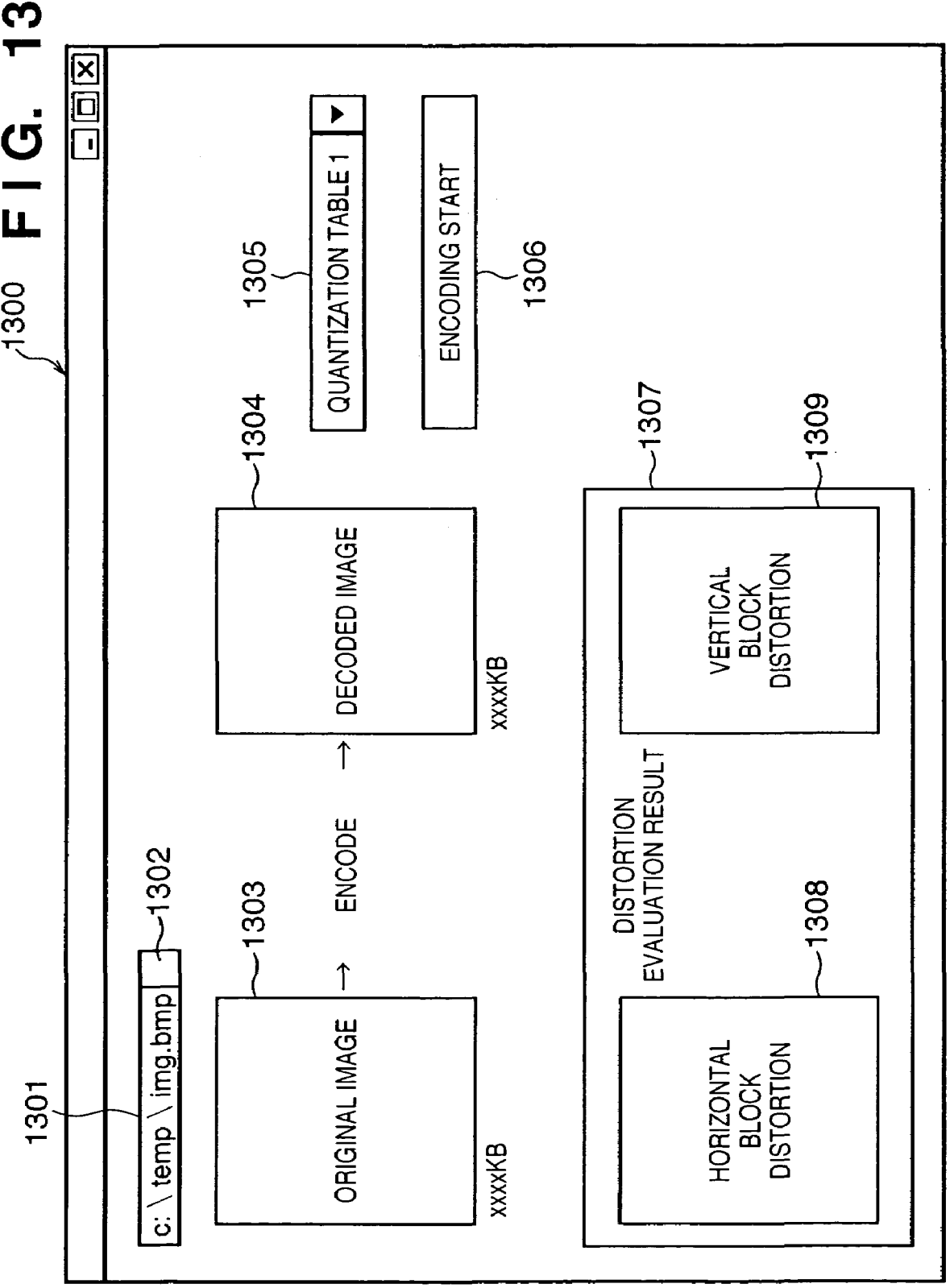
FIG. 13 shows an application window used to display an evaluation result in the first embodiment.

Distortion which is produced at the block boundary depends not only on the quantization scale value, but also on original images. Given an original image, its one region may suffer less distortion, while its another region may suffer large distortion. Therefore, in order to generate encoded data that the user wants in view of the encoded data size (or compression ratio) with respect to the data size of an original image and evaluation index values of a decoded image obtained from an encoded image, the aforementioned evaluation index values are preferably presented to the user by some means. FIG. 13 shows a user interface used when the function implementation means in this embodiment are implemented by a general-purpose information processing apparatus such as a personal computer or the like.

Referring to FIG. 13, reference numeral 1300 denotes a window serving as a user interface. Reference numeral 1301 denotes a file name field used to input the location of a file of an original image. This field is used to select a non-compressed image. Upon clicking a button 1302, a browser for file selection can be displayed to select a file. Note that a non-compressed image may be directly input from an image scanner, digital camera, or the like in place of designating a file.

Reference numeral 1303 denotes a display area for displaying the designated original image; and 1304, an area for displaying a decoded image obtained after the original image is compression-encoded. Note that a file after compression encoding is saved with an extension "jpg" in the same path as the original image.

Reference numeral 1305 denotes a field used to select a quantization table. In this case, the field 1305 has a combo box format (any other field types may be used as long as a quantization table can be selected). That is, by clicking the right end in FIG. 13, a plurality of quantization tables which are registered in advance are displayed. The user selects one of these quantization tables to determine a quantization table used in compression encoding ("quantization table 1" is selected as default). Reference numeral 1306 denotes a button used to issue a start instruction of compression encoding. By clicking this button 1306, the designated original image undergoes JPEG compression encoding using the designated quantization table, and compression-encoded data obtained as a result of that process is decoded and displayed on the area 1304.

Reference numeral 1307 denotes a distortion evaluation result display area. In this embodiment, since horizontal and vertical block distortion evaluation index values are calculated, as described above, two display areas 1308 and 1309 are assured, as shown in FIG. 13.

The operation processing sequence of an evaluation application that presents the window 1300 shown in FIG. 13 will be described below with reference to the flowchart in FIG. 14.

In step S1, a file name of an original image is input (or an original image itself is input). After this input operation, the input image is displayed on the area 1303 in FIG. 13. Since the original image size is normally larger than the area 1303, a reduced-scale image is generated and displayed by executing a decimation process, by generating one pixel by averaging a plurality of pixels, or the like. Also, the data size of the original image is displayed, as shown in FIG. 13.

The flow advances to step S2 to determine an encoding parameter (a quantization table in this embodiment). This operation is attained by operating the combo box 1305 in FIG. 13. After that, the control waits until the encoding start button 1306 is clicked in step S3.

After the encoding start instruction is issued, the flow advances to step S4 to apply a compression encoding process of the designated (input) original image in accordance with the designated encoding parameter (quantization table). The compression-encoded image data is saved as a JPEG file at the same location as the original image or at a predetermined location.

Upon completion of compression encoding, the flow advances to step S5 to decode the generated compression-encoded data, and to display a decoded image on the area 1304. In this case, the data of the compression-encoded file is displayed together (or the compression ratio may be displayed or both of them may be displayed).

The flow advances to step S6 to execute the aforementioned process to calculate the horizontal and vertical evaluation index values. In step S7, the calculation results are imaged to be visually recognizable, and are displayed on the areas 1308 and 1309. If the user inputs a process end instruction in step S8, this process ends. However, if the user is dissatisfied with the relationship between the compression-encoding size (or compression ratio) and distortion, the process is repeated from step S2.

In the above process, a practical example of the process in step S7 will be explained below. In this embodiment, JPEG encoding is taken as an example. Assume that a DCT process is done for respective 8×8 pixel blocks.

Since each individual block size is known, the boundary positions between neighboring blocks are also known. For each block, two blocks neighbor in the horizontal direction, and two blocks also neighbor in the vertical direction (each block at the end of an image has no neighboring block at least in one of the horizontal and vertical direction).

This embodiment uses the distortion evaluation index values at block boundaries. Hence, the average value of horizontal evaluation index values in an inner 6×6 pixel region other than 30 pixels located at the boundaries of an 8×8 pixel block (to be referred to as an intra-block horizontal evaluation index value hereinafter), and the average value of vertical evaluation index values in an inner 6×6 pixel region (to be referred to as an intra-block vertical evaluation index value hereinafter) are calculated. Then, the average value of right and left 16 evaluation values located at the horizontal boundaries (to be referred to as a block boundary horizontal evaluation index value hereinafter) and the average value of upper and lower 16 evaluation values located at the vertical boundaries. (to be referred to as a block boundary vertical evaluation index value hereinafter) are calculated.

A result obtained by subtracting the intra-block horizontal evaluation index value from the block boundary horizontal evaluation index value is determined as a horizontal block distortion evaluation amount of the block of interest. Likewise, a result obtained by subtracting the intra-block vertical evaluation index value from the block boundary vertical evaluation index value is determined as a vertical block distortion evaluation amount of the block of interest.

The horizontal and vertical block distortion evaluation amounts obtained in this way are displayed as luminance information on the areas 1308 and 1309 shown in FIG. 13. Therefore, since the user can recognize higher block distortion with increasing luminance, he or she can obtain an index for selecting another encoding parameter. In this case, distortion is expressed by luminance grayscale values but may be expressed by color.

As described above, according to this embodiment, the user can recognize an objective block distortion amount of a decoded image obtained by decoding the compression result upon compression-encoding an image with respect to its original image. Also, the user can determine the data size and image quality in consideration of the relationship between the data size after compression or compression ratio, and block distortion.

Note that the above embodiment is implemented as an application in the general-purpose information processing apparatus such as a personal computer or the like. For example, this embodiment may be implemented in a digital camera or the like. Since the digital camera has a limited display screen size and it is difficult to make display shown in FIG. 13, respective image display areas are switched as needed.

Second Embodiment

The second embodiment of the present invention will be described below. In the second embodiment, horizontal and vertical quantitative evaluation indices BND_h(i,j) and BND_v(i,j) of block distortion are calculated by:

$$BND\_h(i,j)=Dh(i,j)/(Dh\_av)$$

$$BND\_v(i,j)=Dv(i,j)/(Dv\_av)$$

$$Dh(i,j)=|X'\_h(i,j)-Y'\_h(i,j)|$$

$$Dv(i,j)=|X'\_v(i,j)-Y'\_v(i,j)|$$

The larger these values BND_h(i,j) and BND_v(i,j), the larger the block distortion produced. Note that Dh(i,j) and Dv(i,j) are spatial derivative errors due to the horizontal and vertical encoding processes, and Dh_av is the average of spatial derivative errors calculated for pixels at the same vertical position in the same block in association with Dh(i,j). Dv_av(i,j) is the average of spatial derivative errors calculated for pixels at the same horizontal position in the same block in association with Dv(i,j).

In the second embodiment, the spatial derivatives are calculated using numerical differentiation based on the central difference formula independently in the horizontal and vertical directions. When the numerical differentiation based on the central difference formula is used, a horizontal spatial derivative X'_h(i,j) and a vertical spatial derivative X'_v(i,j) of a luminance value X(i,j) of an original image can be obtained as follows. The same applies to a decoded image.

$$X'\_h(i,j)=(X(i-1,j)-X(i+1,j))/2$$

$$X'\_v(i,j)=(X(i-1,j)-X(i,j+1))/2$$

Figure 4:
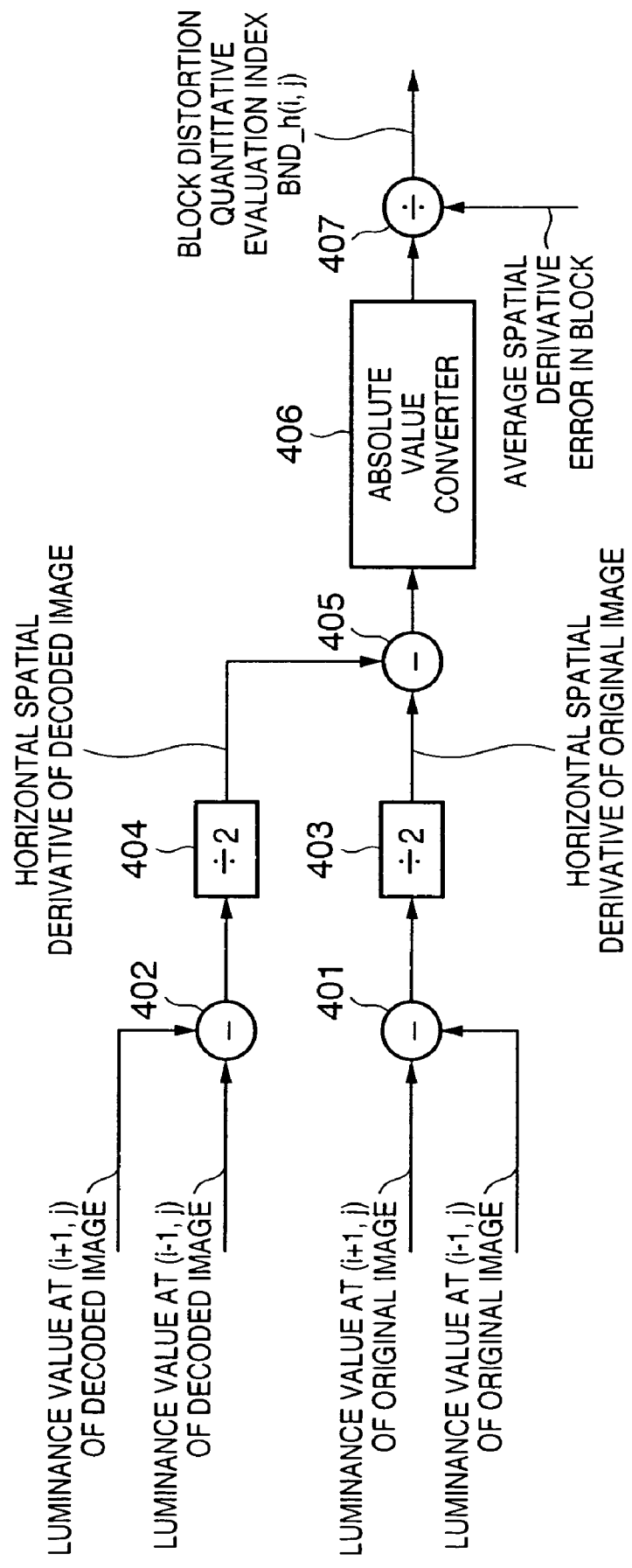
FIG. 4 is a block diagram of a distortion evaluator in the second embodiment.

FIG. 4 shows an arrangement for calculating the quantitative evaluation index (for only the horizontal direction; the same arrangement is used for the vertical direction) of block distortion in the second embodiment.

As shown in FIG. 4, the arrangement includes subtractors 401 and 402, dividers 403 and 404, a subtractor 405, an absolute value converter 406, and a divider 407. Referring to FIG. 4, the subtractor 401 calculates the difference between X(i−1,j) and X(i+1,j) and the divider 403 divides the difference by "2" so as to attain numerical differentiation using the central difference formula. Likewise, the subtractor 402 calculates the difference between Y(i−1,j) and Y(i+1,j) and the divider 404 divides the difference by "2". The subtractor 405 calculates the difference between the outputs from the dividers 403 and 404 so as to calculate a spatial derivative error due to the encoding process. The absolute value converter 406 makes absolute value conversion to integrate the error to a positive value, and outputs a horizontal spatial derivative error Dh(i,j) of the block of interest. The divider 407 calculates the ratio of the average spatial derivative error in the block of interest to the output from the absolute value converter 406 as the spatial derivative of the pixel of interest, thus outputting BND_h(i,j) as a result.

In the second embodiment, when BND_h(i,j) at the block boundary becomes large, it indicates that the spatial derivative errors at the block boundary are prominent compared to the average value in a block, and block distortion is likely to be present. When encoding is done using a natural image in practice, it is confirmed that block distortion becomes visually conspicuous when BND_h(i,j) is approximately larger than "1.2". In every images, the spatial derivative errors at the block boundary generally become higher than the values of surrounding pixels with increasing quantization scale value. Hence, by relatively comparing the value at the block boundary and that in the block in association with the spatial derivative error, production of block distortion can be detected more accurately and quantitative evaluation can be made independently of a target image. Note that the second embodiment uses the average value as a value that represents the spatial derivative error in a block. Alternatively, a median or the like in a block may be used to allow easier calculations.

Figure 14:
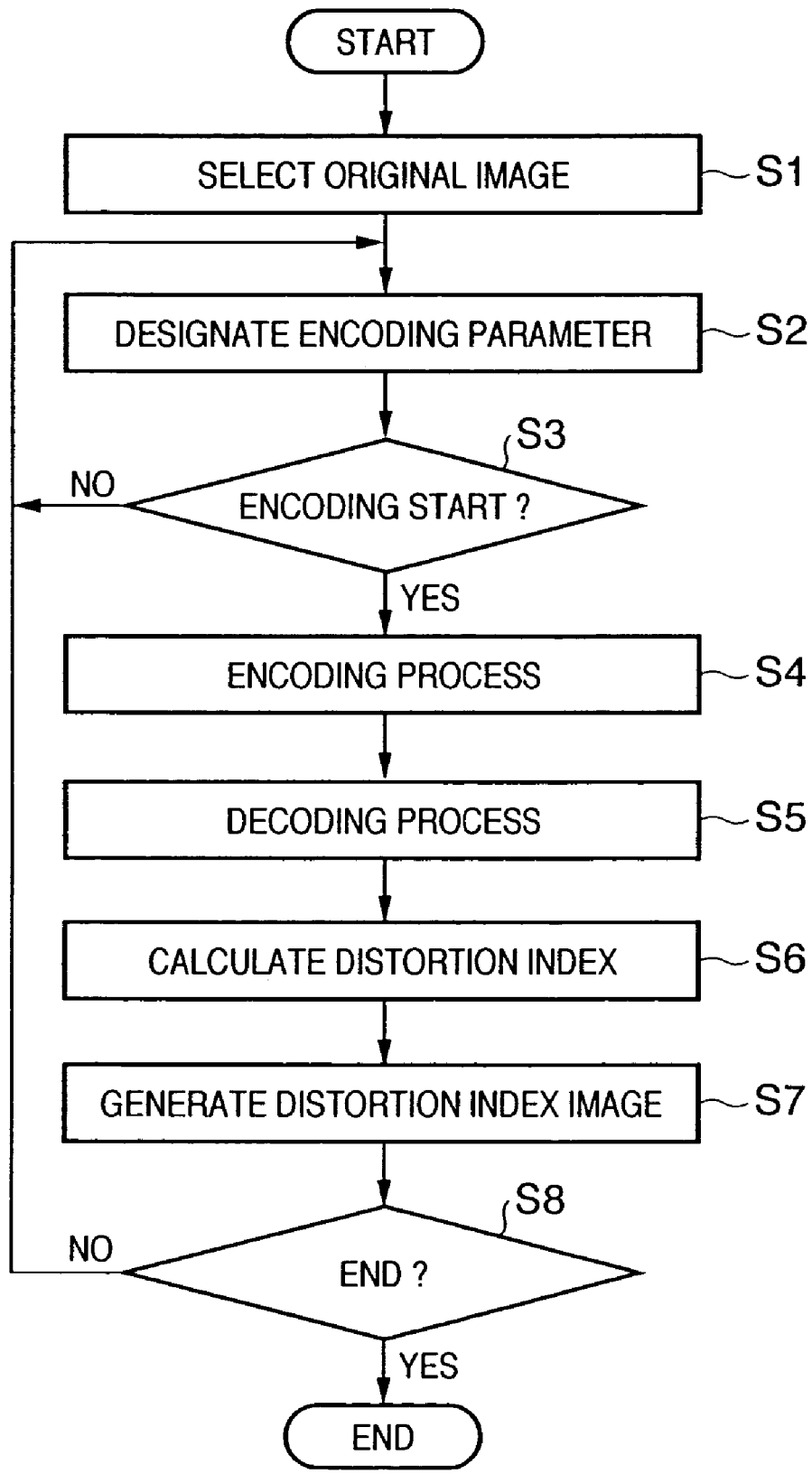
FIG. 14 is a flowchart showing the processing sequence of an application shown in FIG. 13.

Also, an actual evaluation result is displayed by the method according to FIGS. 13 and 14 in the first embodiment, and a description thereof will be omitted. The same applies to embodiments to be described hereinafter.

Third Embodiment

The third embodiment of the present invention will be described below. The third embodiment is characterized in that the evaluation indices of block distortion are calculated in consideration of the human visual characteristics (in terms of spatial derivatives) as follows. In the third embodiment, horizontal and vertical quantitative evaluation indices BND_h(i,j) and BND_v(i,j) of block distortion are calculated by:

$$BND\_h(i,j)=Dh(i,j)/(\alpha \times X'\_h(i,j)+\beta)$$

$$BND\_v(i,j)=Dv(i,j)/(\alpha \times X'\_v(i,j)+\beta)$$

The larger these values BND_h(i,j) and BND_v(i,j), the larger the block distortion produced. Note that the spatial derivative errors Dh(i,j) and Dv(i,j) are calculated in the same manner as in the second embodiment, and spatial derivative calculations are made as in the first embodiment. Also, the coefficient α and constant β associated with the spatial derivatives of an original image indicate the influence of the spatial derivatives associated with the human visual characteristics on the quantitative evaluation indices of block distortion. When α becomes large and β becomes small, the influence of the spatial derivatives on the quantitative evaluation indices of block distortion becomes large.

Figure 5:
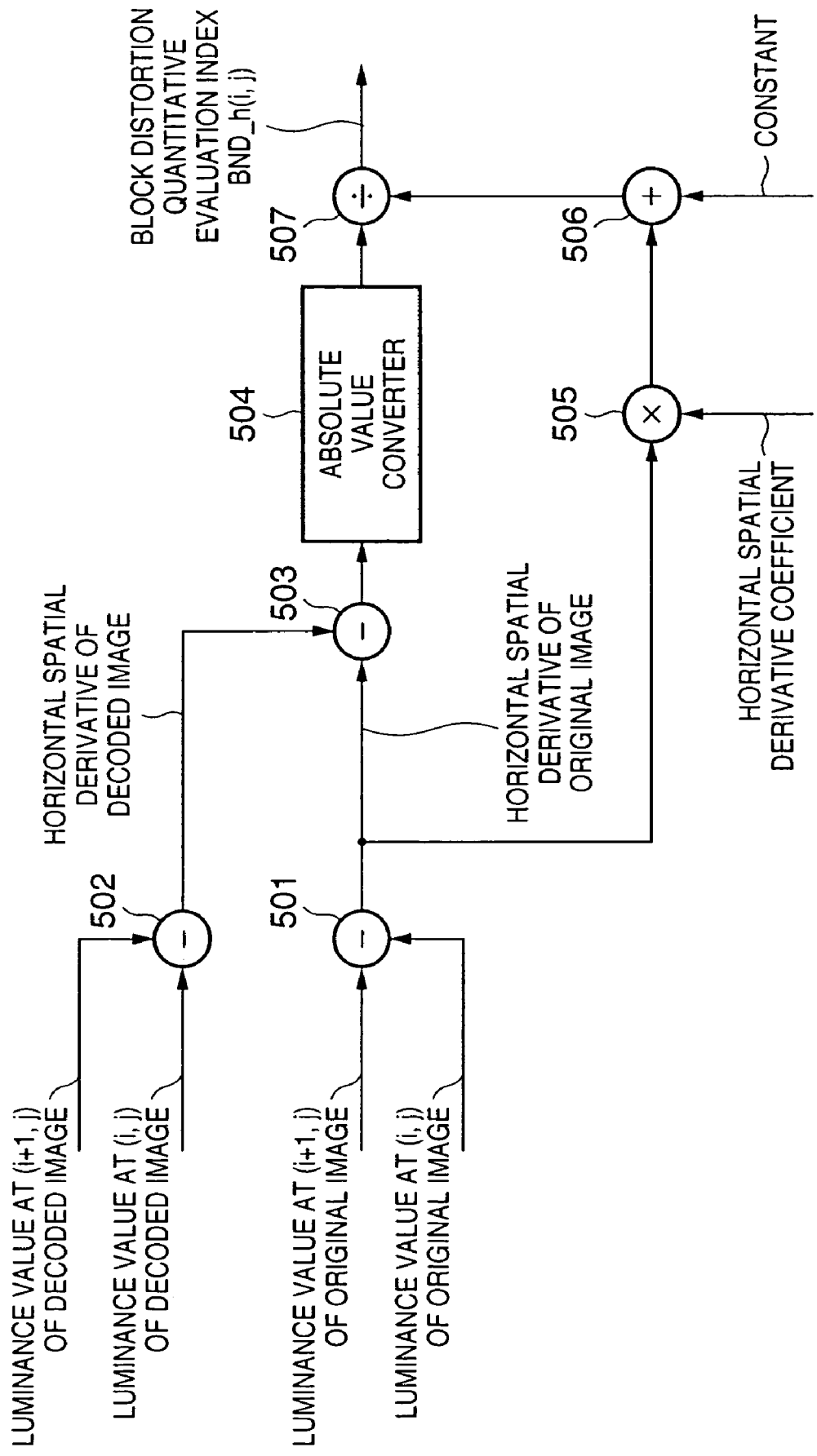
FIG. 5 is a block diagram of a distortion evaluator in the third embodiment.

FIG. 5 shows an arrangement for calculating the quantitative evaluation index (for only the horizontal direction; the same arrangement is used for the vertical direction) of block distortion in the third embodiment.

As shown in FIG. 5, the arrangement includes subtractors 501, 502, and 503, an absolute value converter 504, a multiplier 505, an adder 506, and a divider 507. In FIG. 5, the subtractors 501 and 502 make horizontal spatial derivative calculations for the original image X and decoded image Y using numerical differentiation based on the forward difference formula. The subtractor 503 calculates the difference between the outputs from the subtractors 501 and 502 to calculate an error of the spatial derivative due to the encoding process. The absolute value converter 504 makes absolute value conversion to integrate the error to a positive value, and outputs a horizontal spatial derivative error Dh(i,j) of the block of interest. The multiplier 505 multiplies a spatial derivative X'_h(i,j) of the original image by the coefficient α to take the visual characteristics into consideration. The adder 506 adds the output from the multiplier 505 and constant β to avoid divisions by zero. The divider 607 calculates the ratio-between the outputs from the absolute value converter 504 and adder 506 to take the human visual characteristics into consideration, and outputs a quantitative evaluation index BND_h(i,j) of block distortion as a result.

In the third embodiment, when large distortion is produced at a block boundary, and block distortion is produced on a flat area of an original image where block distortion is conspicuous, BND_h(i,j) becomes large. Hence, block distortion which is conspicuous as visual deterioration can be detected more accurately.

As shown in FIG. 5, the output from the subtractor 501 can be used as a spatial derivative of the original image to be considered as the visual characteristics. Hence, such block distortion quantitative evaluator is implemented by fewer hardware circuit components.

Fourth Embodiment

In the fourth embodiment, the quantitative evaluation indices of block distortion are calculated in consideration of the human visual characteristics (in terms of luminance values of an original image) as follows.

In the fourth embodiment, horizontal and vertical quantitative evaluation indices BND_h(i,j) and BND_v(i,j) of block distortion are calculated by:

$$BND\_h(i,j)=W\_lum(i,j) \times Dh(i,j)$$

$$BND\_v(i,j)=W\_lum(i,j) \times Dv(i,j)$$

Figure 6:
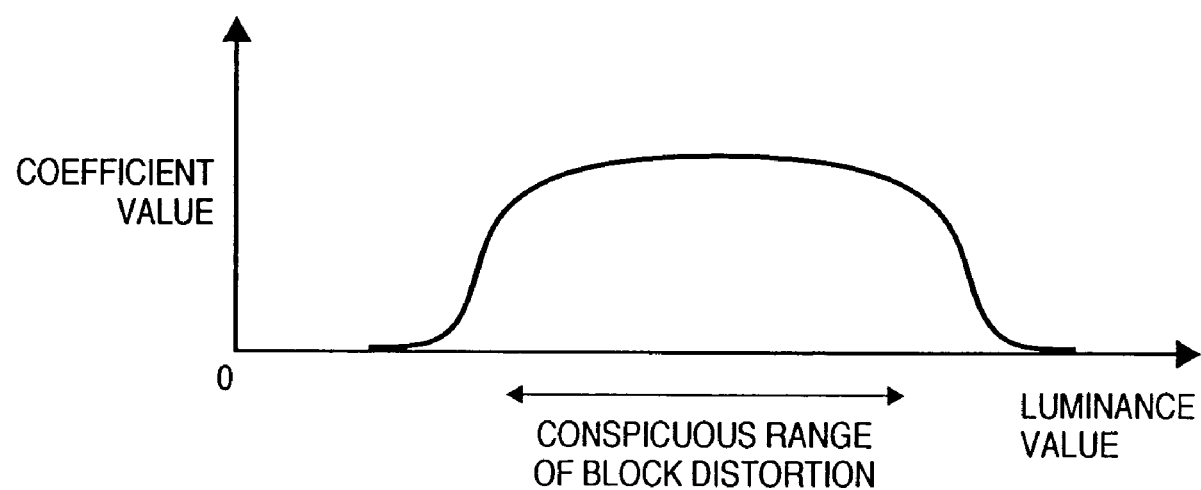
FIG. 6 is a graph showing the relationship between the luminance values of an original image and the coefficient values of a block distortion quantitative evaluation index in the fourth embodiment.

The larger these values BND_h(i,j) and BND_v(i,j), the larger the block distortion produced. Note that the spatial derivative errors Dh(i,j and Dv(i,j) are calculated in the same manner as in the second embodiment, and spatial derivative calculations are made as in the first embodiment. Also, W_lum(i,j) is a coefficient associated with the quantitative evaluation index of block distortion corresponding to a luminance value X(i,j) of an original image. FIG. 6 shows the relationship between the luminance values of an original image and the coefficients. The relationship shown in FIG. 6 is determined in consideration of the human visual characteristics according to which block distortion is visually conspicuous when the luminance value falls within a given range, and it is inconspicuous when the luminance value falls outside the range.

Figure 7:
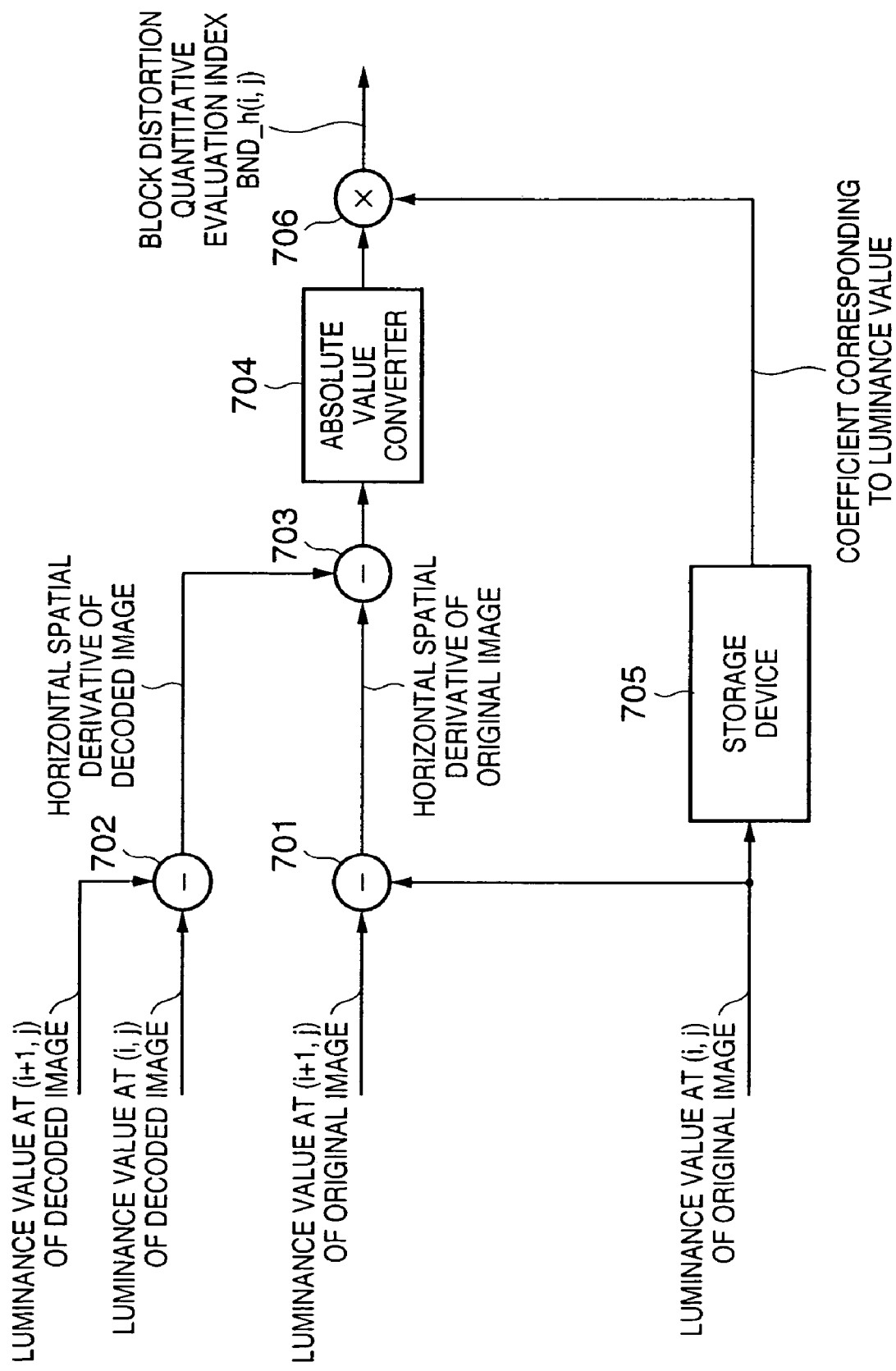
FIG. 7 is a block diagram of a distortion evaluator in the fourth embodiment.

FIG. 7 shows an arrangement for calculating the quantitative evaluation index (for only the horizontal direction; the same arrangement is used for the vertical direction) of block distortion in the fourth embodiment. As shown in FIG. 7, the arrangement includes subtractors 701, 702, and 703, an absolute value converter 704, a storage device 705, and a multiplier 706.

In FIG. 7, the subtractors 701 and 702 make horizontal spatial derivative calculations for the original image and decoded image using numerical differentiation based on the forward difference formula (the same applies to the vertical direction; a description thereof will be omitted). The subtractor 703 calculates the difference between the outputs from the subtractors 701 and 702 to calculate an error of the spatial derivative due to the encoding process. The absolute value converter 704 makes absolute value conversion to integrate the error to a positive value, and outputs a horizontal spatial derivative error Dh(i,j) of the block of interest. The storage device 705 outputs a coefficient value W_lum (i,j) shown in FIG. 6 corresponding to an input luminance value X(i,j) of an original image. The multiplier 706 multiplies Dh(i,j) output from the absolute value converter 704 by the coefficient W_lum(i,j) output from the storage device 705, and outputs BND_h(i,j) as a result.

In the fourth embodiment, when large distortion is produced at a block boundary, and the luminance value falls within a range in which block distortion is conspicuous, BND_h(i,j) becomes large. Hence, block distortion which is conspicuous as visual deterioration can be detected more accurately.

Fifth Embodiment

In the fifth embodiment, the quantitative evaluation indices of block distortion are calculated in consideration of the human visual characteristics (in terms of the position of a pixel of interest in a frame). In the fifth embodiment, horizontal and vertical quantitative evaluation indices BND_h(i,j) and BND_v(i,j) of block distortion are calculated by:

$$BND\_h(i,j)=P\_x(i,j) \times Dh(i,j)$$

$$BND\_v(i,j)=P\_x(i,j) \times Dv(i,j)$$

The larger these values BND_h(i,j) and BND_v(i,j), the larger the block distortion produced. Note that the spatial derivative errors Dh(i,j) and Dv(i,j) are calculated in the same manner as in the second embodiment, and spatial derivative calculations are made as in the first embodiment. Also, P_x(i,j) is a coefficient associated with a quantitative evaluation index of block distortion corresponding to the pixel position (i,j) of the pixel of interest. FIG. 8 shows the relationship between the positions of the pixel of interest in the frame and the coefficients. A numeral in each square in FIG. 8 indicates the coefficient P_c(i,j) associated with the quantitative evaluation index of block distortion corresponding to the position of a macroblock. In a given macroblock, the same coefficient is used. FIG. 8 is determined in consideration of the human visual characteristics according to which block distortion is visually conspicuous as the pixel of interest is closer to the center in the frame, and it is inconspicuous as the pixel of interest is closer to the end in the frame. In FIG. 8, the number of squares is 9×9, but it is determined in correspondence with the original image size. That is, it is desirable that a larger P_x value is set as the pixel position is closer to the central position of an image.

Figure 9:
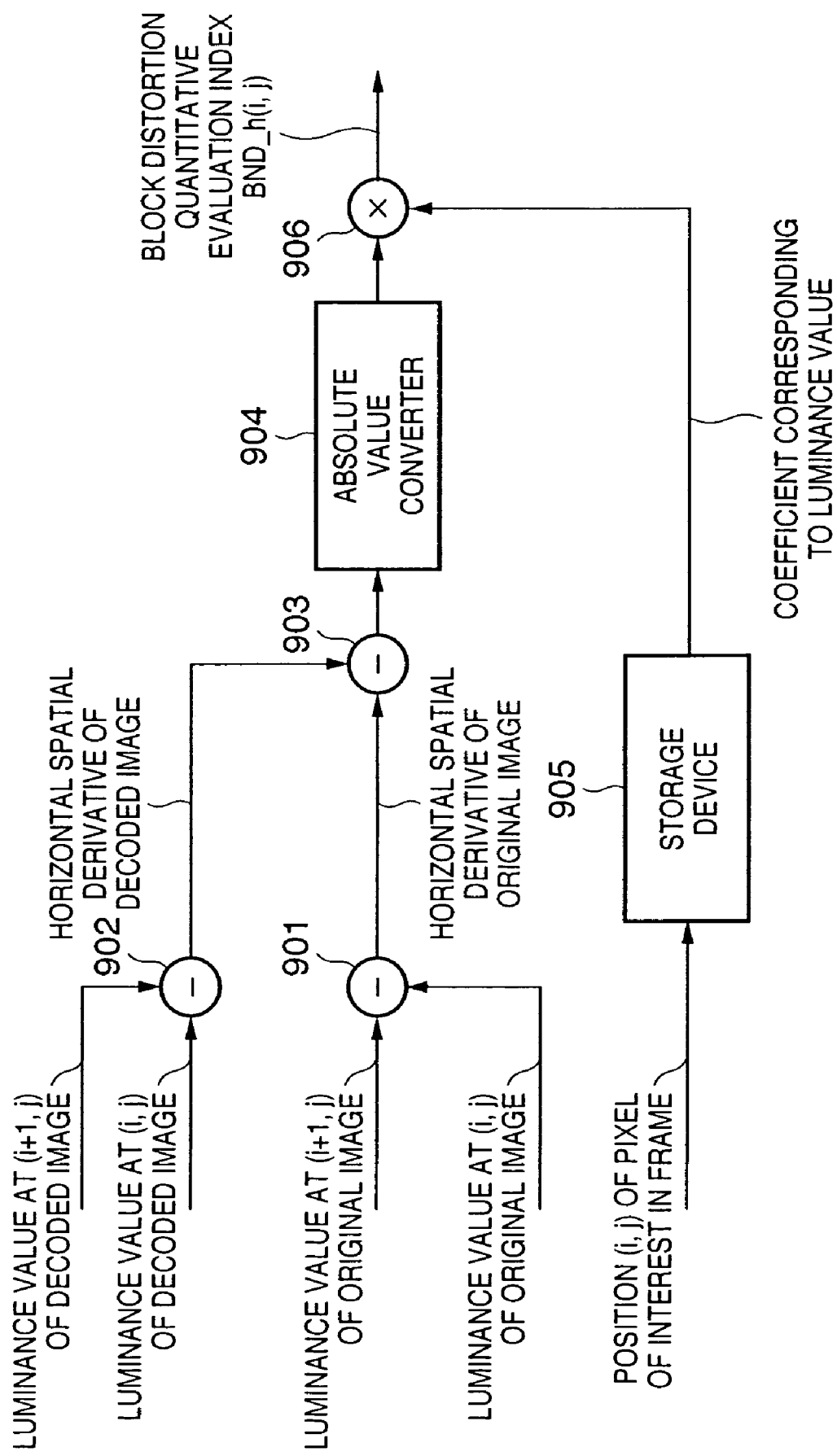
FIG. 9 is a block diagram of a distortion evaluator in the fifth embodiment.

FIG. 9 shows an arrangement for calculating the quantitative evaluation index (for only the horizontal direction; the same arrangement is used for the vertical direction) of block distortion in the fifth embodiment. As shown in FIG. 9, the arrangement includes subtractors 901, 902, and 903, an absolute value converter 904, a storage device 905, and a multiplier 906.

In FIG. 9, the subtractors 901 and 902 make horizontal spatial derivative calculations for the original image and decoded image using numerical differentiation based on the forward difference formula (the same applies to the vertical direction; a description thereof will be omitted). The subtractor 903 calculates the difference between the outputs from the subtractors 901 and 902 to calculate an error of the spatial derivative due to the encoding process. The absolute value converter 904 makes absolute value conversion to integrate the error to a positive value, and outputs a horizontal spatial derivative error Dh(i,j) of the block of interest. The storage device 905 outputs a coefficient value P_x(i,j) shown in FIG. 8 corresponding to the position (i,j) of the pixel of interest input as an address. The multiplier 906 multiplies Dh(i,j) output from the absolute value converter 904 by the coefficient P_x(i,j) output from the storage device 905, and outputs BND_h(i,j) as a result.

In the fifth embodiment, when large distortion is produced at a block boundary, and the pixel of interest is located near the center of a frame, BND_h(i,j) indicating block distortion becomes large. Hence, block distortion which is conspicuous as visual deterioration can be detected more accurately.

Sixth Embodiment

The sixth embodiment implements the block distortion quantitative evaluator in a moving image encoder.

Figure 10:
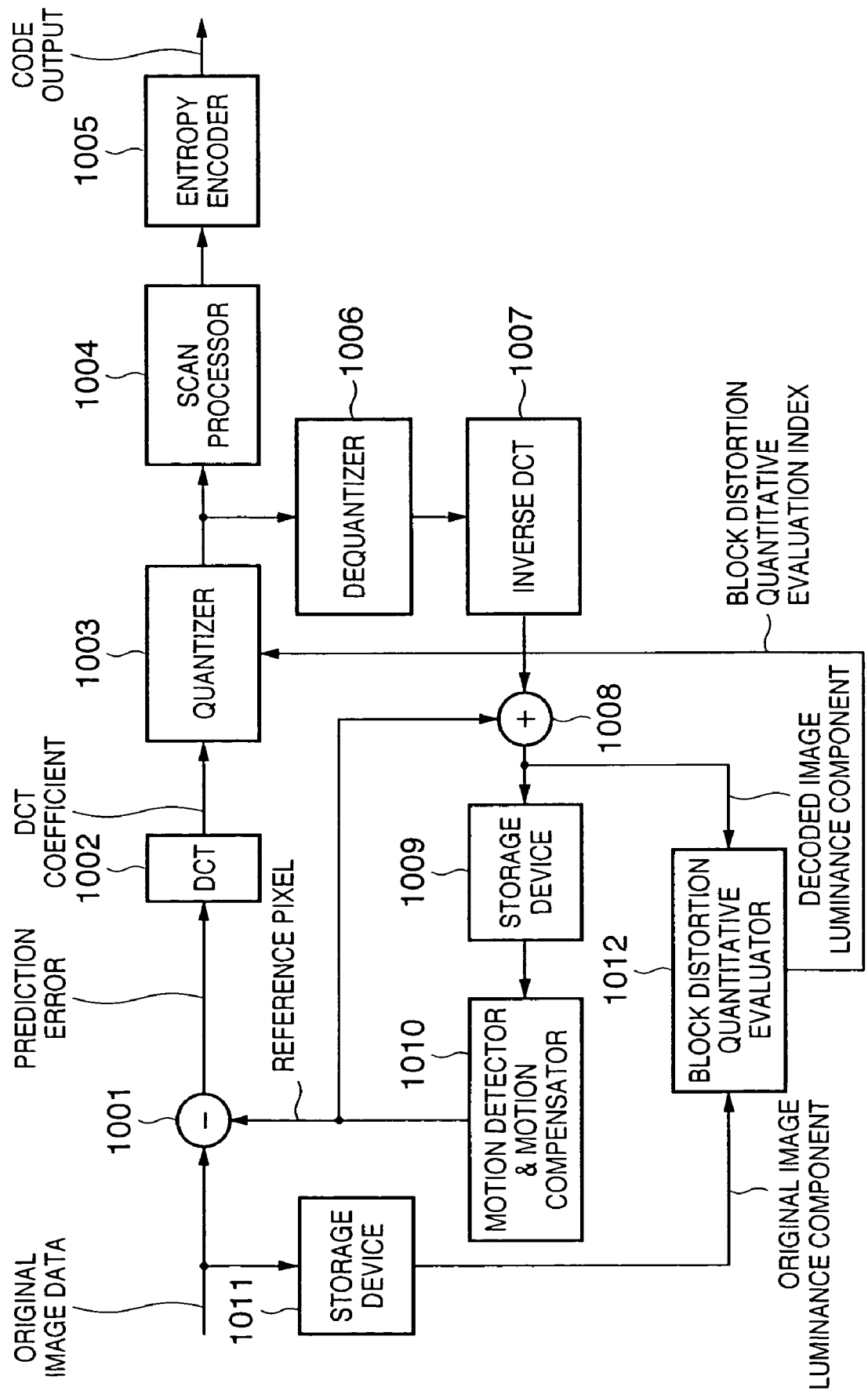
FIG. 10 is a block diagram of a moving image encoder in the sixth embodiment.

FIG. 10 is a block diagram of a moving image encoder in the sixth embodiment. This encoder includes a subtractor 1001, DCT calculator 1002, quantizer 1003, scan processor 1004, entropy encoder 1005, dequantizer 1006, inverse DCT calculator 1007, adder 1008, storage device 1009, motion detector & motion compensator 1010, storage device 1011, and block distortion quantitative evaluator 1012.

Referring to FIG. 10, the subtractor 1001 does not execute any subtraction process in intra-frame encoding that encodes using only information in a frame, and outputs input original image data to the DCT calculator 1002. On the other hand, the subtractor 1001 subtracts motion-detected image data output from the motion detector & motion compensator from input original image data in inter-frame prediction encoding that predicts based on temporally different frames, and outputs a prediction error as a subtraction result to the DCT calculator 1002.

The DCT calculator 1002 applies DCT transformation to input data segmented into blocks for respective blocks, and outputs DCT coefficients to the quantizer 1003. The quantizer 1003 quantizes the DCT coefficients using quantization table values corresponding to positions in a block, and a quantization scale value of that block, and outputs all quantized DCT coefficients to the scan processor 1004 and also to the dequantizer 1006 at the same time. The scan processor 1004 performs scan processes such as a zigzag scan, vertical scan, horizontal scan, and the like in accordance with an encoding mode. The entropy encoder 1005 entropy-encodes the output from the scan processor 1004, and outputs the encoded data as codes.

In the moving image encoder of the sixth embodiment, a local decoding process is executed using the dequantizer 1006 and inverse DCT calculator 1007 so as to attain motion detection & motion compensation.

The dequantizer 1006 dequantizes the quantized DCT coefficients of the block of interest using the quantization scale value of that block, and outputs dequantized coefficients to the inverse DCT calculator 1007. The inverse DCT calculator 1007 applies inverse DCT transformation to the dequantized DCT coefficients for respective blocks, and outputs a decoded prediction error to the adder 1008. The adder 1008 adds the prediction value output from the motion detector & motion compensator 1010 and the decoded prediction error output from the inverse DCT calculator 1007, and stores the sum data as a decoded reference image (decoded frame) in the storage device 1009.

Note that the block distortion quantitative evaluator 1012 implemented in the moving image encoder receives luminance components of an original image stored in the storage device 1011, and those of a decoded image obtained from the adder 1008. The evaluator 1012 quantitatively evaluates block distortion using block distortion quantitative evaluation means, and outputs the quantitative evaluation indices of block distortion as a result. Note that the block distortion quantitative evaluator can adopt the method of any of the aforementioned embodiments. As shown in FIG. 10, since the decoded image as an input to the block distortion quantitative evaluator is calculated by a local decoder based on a general moving image encoding method, no special circuit need be added to calculate the decoded image. Hence, the block distortion quantitative evaluator can be implemented by a minimum increase in circuit scale in the moving image encoder, and the following image quality improvement process can be done.

Upon confirming the evaluation amount, the evaluation amount for each frame is displayed as a moving image in which a position suffering large distortion has a high luminance value (or different color) as well as an input moving image.

In general, a moving image has strong temporal correlation. When the same encoding process is applied, block distortion of the current picture has strong correlation with that produced in the next picture. Hence, a block distortion reduction process (an area where block distortion is to be reduced, and the application level of the reduction process) for the next picture is determined on the basis of the information of the current picture.

In FIG. 10, the quantitative evaluation indices output from the block distortion quantitative evaluator 1012 are fed back to the quantizer 1003. When only some macroblocks suffer block distortion, a process for decreasing the quantization scale values of macroblocks corresponding to the same positions in the next picture, and increasing the quantization scale values of macroblocks free from any block distortion is executed, thus reducing block distortion on the entire frame while maintaining the designated bit rate. Note that the above process can be implemented as follows: a plurality of threshold values may be set in advance, a distortion level may be obtained depending on a threshold value range in which the block distortion index value of each macroblock falls, and a quantization scale value is selected accordingly.

By executing the aforementioned process in the moving image encoder, even when an image is encoded at a low bit rate, and the encoded image is decoded by a general decoder that complies with the moving image encoding international standard such as MPEG or the like, image quality deterioration can be minimized.

Seventh Embodiment

The seventh embodiment will explain an example in which the present invention is applied to a moving image taking apparatus such as a digital video camera or the like.

Figure 11:
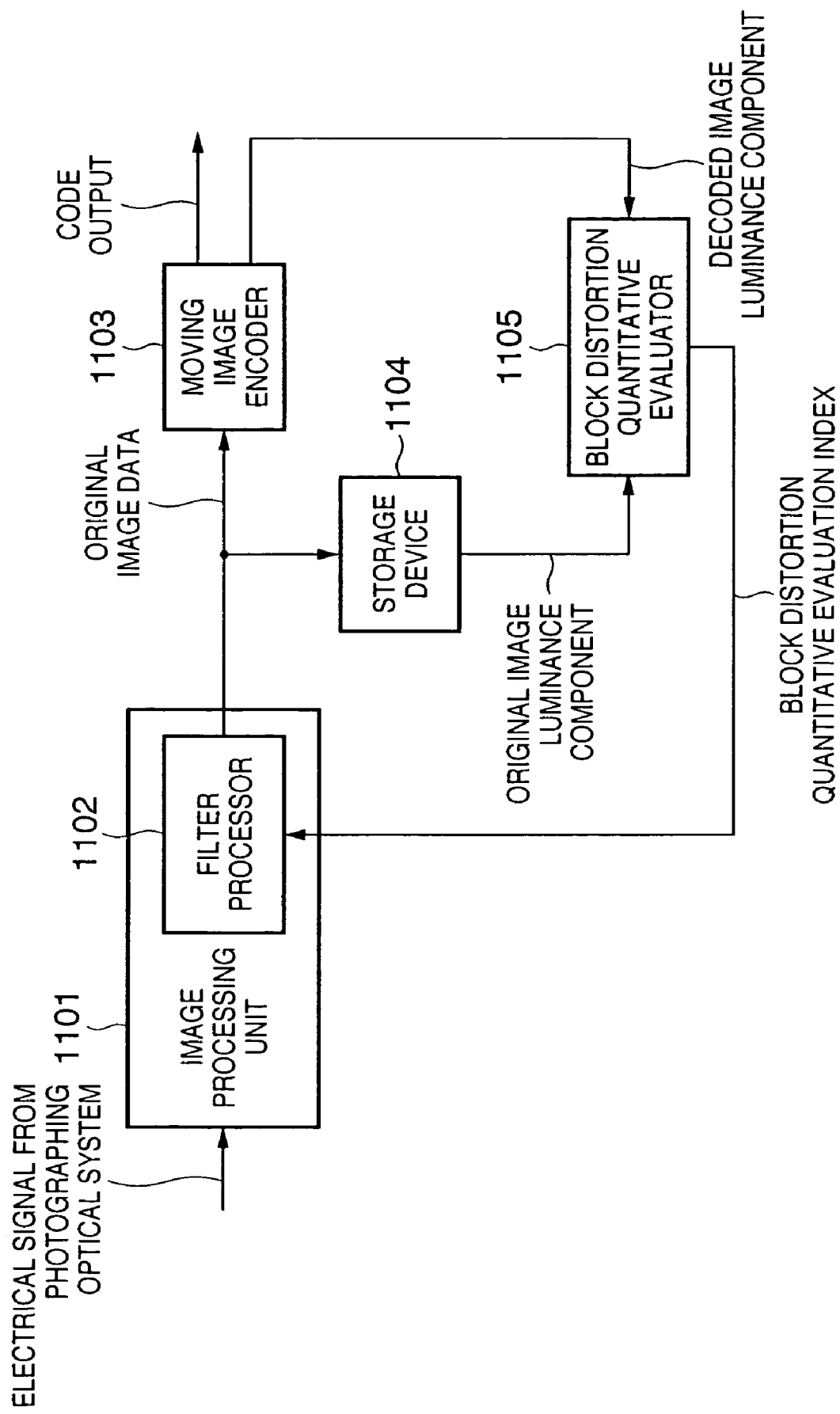
FIG. 11 is a block diagram of an image processing unit and moving image encoder in a moving image taking apparatus in the seventh embodiment.

FIG. 11 is a block diagram of an image processing unit and moving image encoder in the moving image taking apparatus in the seventh embodiment. As shown in FIG. 11, this apparatus includes an image processing unit 1101, a filter processor 1102 in the image processing unit, a moving image encoder 1103, a storage device 1104, and a block distortion quantitative evaluator 1105.

In the moving image taking apparatus of the seventh embodiment, the filter processor 1102 in the image processing unit 1101 applies a filter process to an electrical signal output from a photographing optical system, and an original image is then output to the moving image encoder 1103. Note that the frequency characteristics of an original image to be input to the moving image encoder 1103 can be changed by changing the frequency characteristics of the filter process.

In FIG. 11, the moving image encoder 1103 has the same arrangement as that of the sixth embodiment. That is, the encoder 1103 outputs codes, and also outputs a decoded image from a local decoder at the same time.

The block distortion quantitative evaluator 1105 receives luminance components of an original image stored in the storage device 1104, and those of a decoded image obtained from the moving image encoder 1103. The evaluator 1105 performs quantitative evaluation using block distortion quantitative evaluation means of any one of the first to fifth embodiments, and outputs the quantitative evaluation indices of block distortion as a result to the filter processor 1102 in the image processing unit. The filter processor 1102 changes the frequency characteristics of its filter using the input block distortion quantitative evaluation indices (information indicating an area in which block distortion is produced, and the degree of block distortion). This filter process can be changed within an arbitrary range such as a broad range including a block boundary independently from a unit of the block process or the like, and can reduce block distortion produced at the block boundary. In an area where serious block distortion is produced, the filter characteristics are changed to serve as a low-pass filter with a lower cutoff frequency with respect to the same area of the next picture. By lowering the cutoff frequency, high-frequency components including frequency components at which block distortion is produced in an original image input to the moving image encoder are reduced in advance, and the encoding efficiency in the entropy encoder can be improved. As a result, block distortion in a decoded image can be reduced.

By implementing the block distortion quantitative evaluator 1105 in the moving image encoder in this way, block distortion can be quantitatively evaluated more accurately, and a block distortion reduction process can be applied only when it is required. Hence, even when an image is encoded at a low bit rate, and the encoded image is decoded by a general decoder that complies with the moving image encoding international standard such as MPEG or the like, image quality deterioration can be minimized.

Other Embodiments

In the first to seventh embodiments, as their basic arrangement, the spatial differentiator 101 calculates the spatial derivative of an original image, the spatial differentiator 102 calculates that of a decoded image, and the evaluation information calculator 103 receives the two calculation results and determines an evaluation amount, as shown in FIG. 1.

The present invention is not limited to such specific arrangement. That is, as shown in FIG. 15, a subtractor 1501 may calculate the difference between the original image X and decoded image Y, a spatial differentiator 1502 may calculate the derivative of that difference, and a comparator 1503 may determine an evaluation amount.

Figure 15:
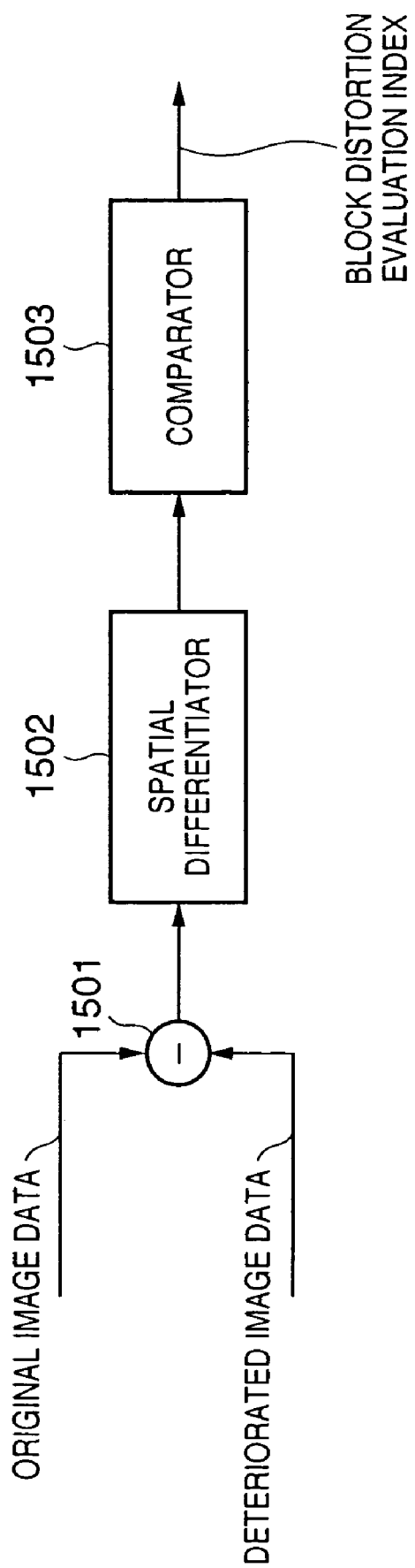
FIG. 15 is a functional block diagram of a modification of a block distortion qualitative evaluator in the embodiment.
Figure 16:
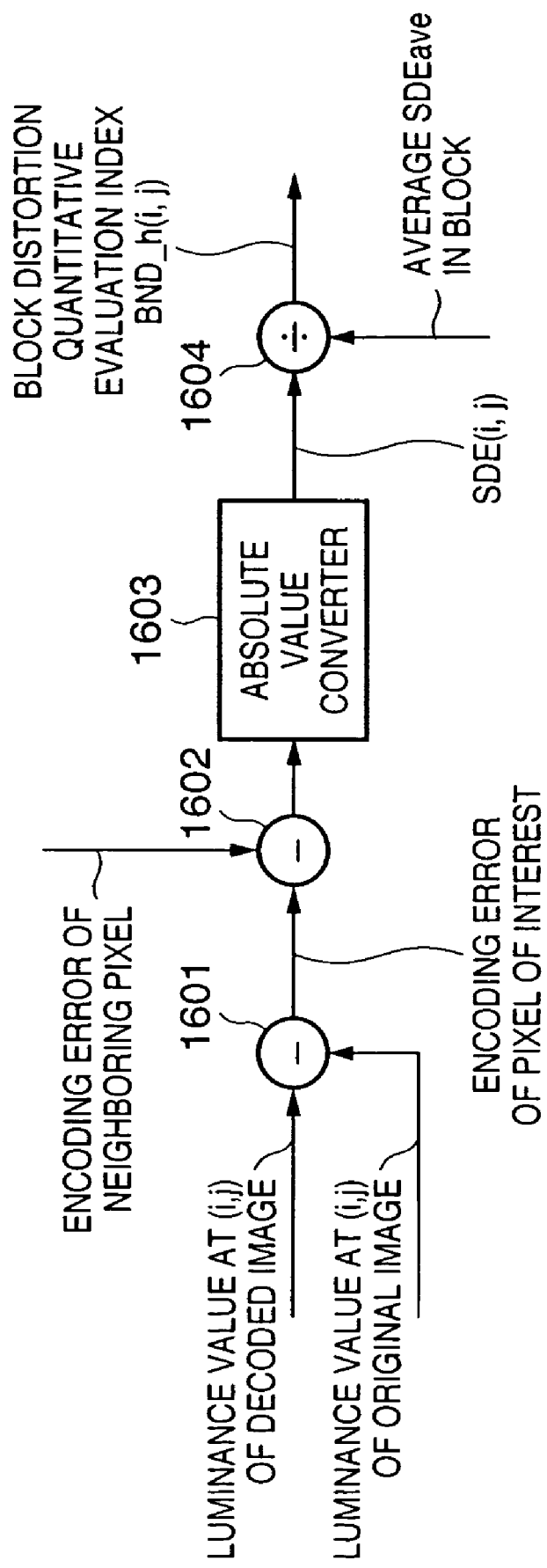
FIG. 16 is a block diagram of a distortion evaluator according to a modification of the first embodiment.

FIG. 16 shows a practical example of the arrangement of FIG. 15. FIG. 16 shows an arrangement for obtaining a horizontal quantitative evaluation index value BND_h(i,j), which corresponds to the first embodiment described above, and is presented as a modification of the first embodiment.

That is, a subtractor 1601 calculates the difference value between luminance values at the position of the pixel of interest (i,j) of an original image and decoded image, and outputs the result. A subtractor 1602 calculates the difference value between the value output from the subtractor 1601 and the difference value between the original image and decoded image at a pixel position (i+1,j) that neighbors the pixel of interest, thus calculating the spatial derivative (horizontal derivative) of the difference values of the two images.

Let E be the subtraction result of the subtractor 1601 and E' be that of the subtractor 1602. Then, the subtractor 1601 calculates:

$$E(i,j) = X(i,j) - Y(i,j)$$

The subtractor 1602 calculates:

$$E'(i, j) = E(i, j) - E(i+1, j)$$
$$= X(i, j) - Y(i, j) - \{X(i+1, j) - Y(i+1, j)\}$$
$$= \{X(i, j) - X(i+1, j)\} - \{Y(i, j) - Y(i+1, j)\}$$
$$= X'\_h(i, j) - Y'\_h(i, j)$$

This result is converted into an absolute value converter 1603. Hence, let SDE (Spatial Derivation of coding Error) be the output of the absolute value converter 1603. Then, SDE(i,j) becomes equivalent to BND_h(i,j) in the first embodiment.

SDE(i,j) is input to a divider 1604, and is divided by an average SDE value (=SDEave) of a block including the position of the pixel of interest (i,j). The quotient is output as BND_h(i,j) of this embodiment. Upon calculating SDEave, pixels at block boundaries may be excluded, and SDE located inside the boundaries may be used.

Since block distortion is readily produced near the block boundary, as shown in FIG. 3, BND_h(i,j) in this embodiment readily becomes larger than 1 near the block boundary, and assumes a neighboring value of 1 in a block. Hence, this BND_h(i,j) can be used as an evaluation amount of distortion. As can be seen from the above description, a vertical evaluation amount can be generated in the same manner as described above.

Note that the method of informing the user of this evaluation amount is the same as the first embodiment, and a detailed description thereof will be omitted.

Modifications of the second to fifth embodiments will be described hereinafter.

Figure 17:
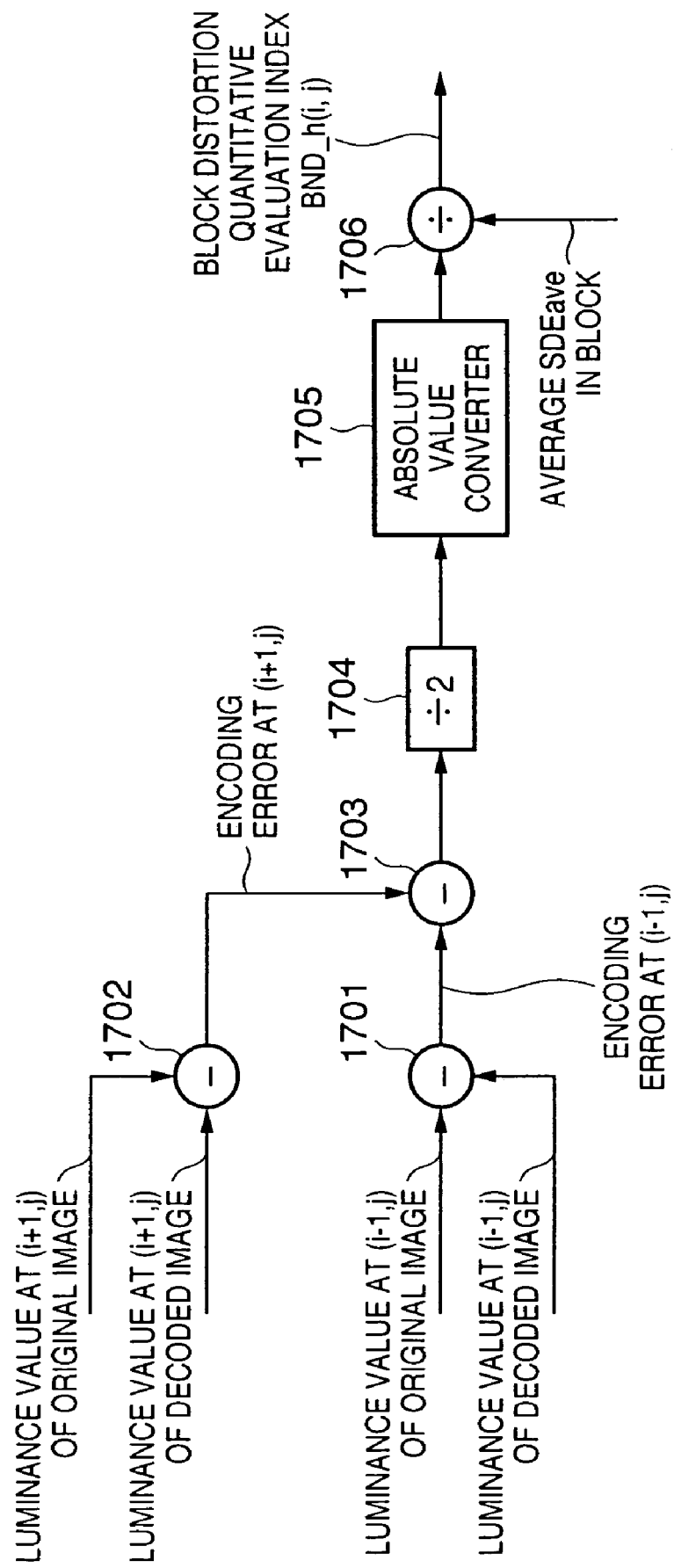
FIG. 17 is a block diagram of a distortion evaluator according to a modification of the second embodiment.

FIG. 17 corresponds to the second embodiment (FIG. 4). In FIG. 4, the subtractor 401 receives pixel data X(i−1,j) and X(i+1,j) in the original image X, and the subtractor 402 receives pixel data Y(i−1,j) and Y(i+1,j) in the decoded image Y. However, in FIG. 17, a subtractor 1701 receives X(i−1,j) and Y(i−1,j), and a subtractor 1702 receives X(i+1,j) and Y(i+1,j). Except for these points, the arrangement in FIG. 17 is substantially the same as that in FIG. 4, and a description thereof will be omitted.

Figure 18:
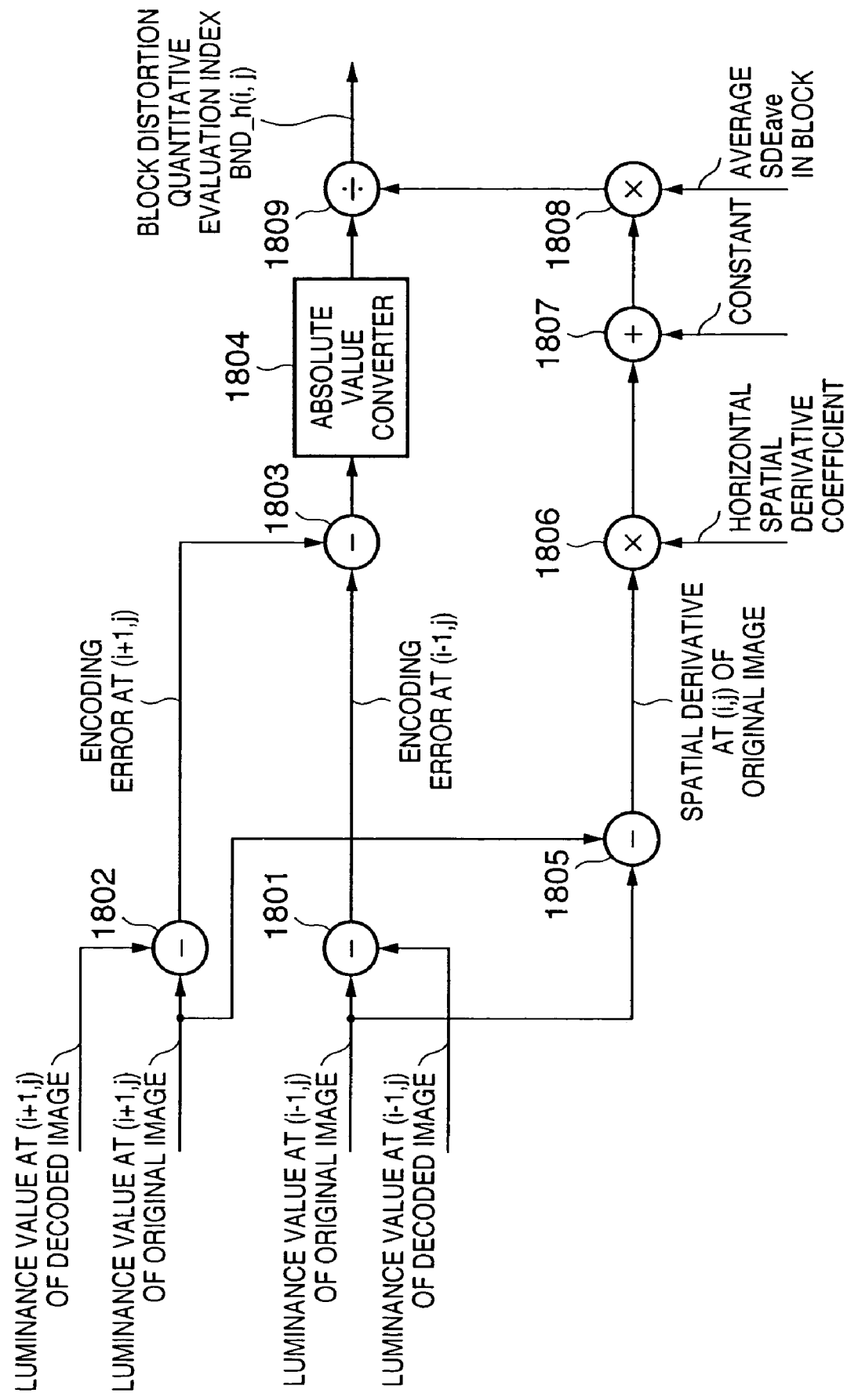
FIG. 18 is a block diagram of a distortion evaluator according to a modification of the third embodiment.

FIG. 18 corresponds to FIG. 5 of the third embodiment. The arrangement in FIG. 18 is substantially the same as that in FIG. 5, except that a subtractor 1805 subtracts X(i+1,j) from X(i,j) of the original image X, and the concept of SDEave is adopted. Since other algorithms are apparent from the above description, a description thereof will be omitted.

Figure 19:
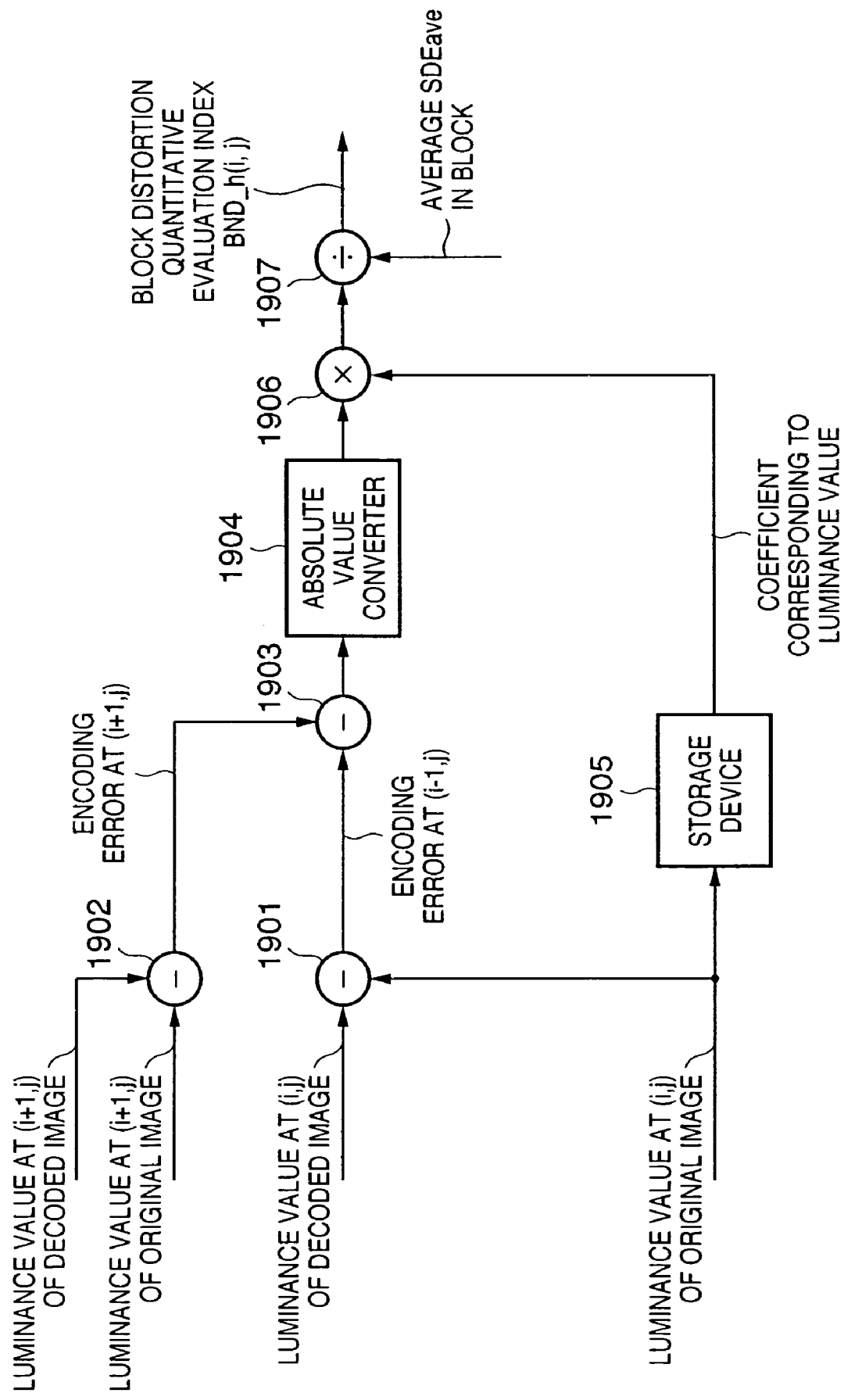
FIG. 19 is a block diagram of a distortion evaluator according to a modification of the fourth embodiment.

FIG. 19 corresponds to FIG. 7 of the fourth embodiment. The differences between FIGS. 19 and 7 are that input data are different, and the concept of SDEave is adopted in FIG. 19. Since other algorithms are apparent from the above description, a description thereof will be omitted.

Figure 20:
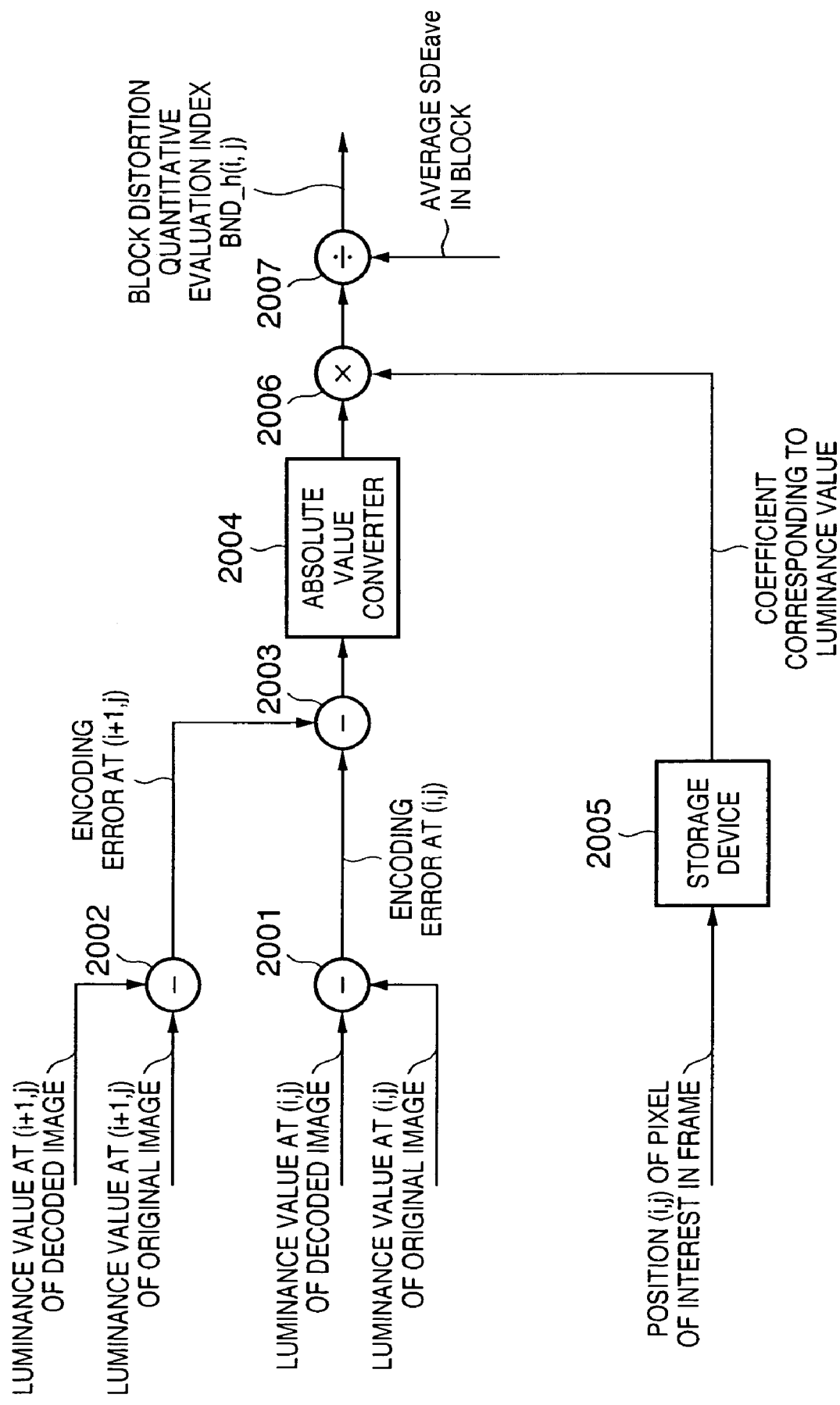
FIG. 20 is a block diagram of a distortion evaluator according to a modification of the fifth embodiment.

FIG. 20 corresponds to FIG. 9 of the fifth embodiment. The differences between FIGS. 20 and 9 are that input data are different, and the concept of SDEave is adopted in FIG. 20. Since other algorithms are apparent from the above description, a description thereof will be omitted.

Note that the arrangement and concept shown in FIG. 15 can be applied to the sixth and seventh embodiments, as can be seen from the above description.

The embodiments of the present invention have been explained. As described above, the functions of respective embodiments can be implemented by an application program that runs on a general-purpose information processing apparatus. Therefore, the present invention includes such computer program within its scope. Furthermore, a program that runs on a computer is copied or installed in the system by setting a computer-readable storage medium such as a CD-ROM or the like in the computer. Hence, the scope of the present invention includes such computer-readable storage medium.

As described above, according to the arrangement of the present invention, information required to quantitatively evaluate block distortion of an image based on encoded data that utilizes a compression encoding technique for respective blocks can be obtained.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-390752 filed on Nov. 20, 2003, which is hereby incorporated by reference herein.

What is claimed is:

1. An image processing apparatus for generating information required to evaluate image quality of a decoded image expressed by code data, which is obtained by compression-encoding original image data based on a set encoding parameter, comprising:
   an encoding unit, arranged to compression-encode the original image data in accordance with a given encoding parameter;
   a decoding unit, arranged to generate decoded image data by decoding encoded data obtained by said encoding unit;
   a first spatial derivative calculation unit, arranged to make a spatial derivative calculation of the original image data;
   a second spatial derivative calculation unit, arranged to make a spatial derivative calculation of the decoded image data; and
   an evaluation information calculation unit, arranged to calculate evaluation information, used as an index of block distortion of the image encoded by said encoding unit, on the basis of results obtained by said first and second spatial derivative calculation units.

2. The apparatus according to claim 1, wherein said first and second spatial derivative calculation units respectively calculate a difference value between pixels which neighbor in the horizontal direction, and a difference value between pixels which neighbor in the vertical direction.

3. The apparatus according to claim 1, wherein said evaluation information calculation unit calculates absolute difference values between horizontal and vertical derivatives of the original image and decoded image.

4. The apparatus according to claim 3, wherein said evaluation information calculation unit further divides the absolute difference value by an average absolute difference value in a block.

5. The apparatus according to claim 1, wherein said first and second spatial derivative calculation units calculate derivatives of luminance components of images, and
   said apparatus further comprises a correction unit, arranged to correct a calculation result of said evaluation information calculation unit in accordance with a luminance value of a pixel of interest in the original image.

6. The apparatus according to claim 5, wherein said correction unit makes correction to increase the calculation result of said evaluation information calculation unit in a middle-luminance range of a possible range of the luminance components, and makes correction to decrease the calculation result of said evaluation information calculation unit as the luminance value is lower and higher.

7. The apparatus according to claim 1, wherein said first and second spatial derivative calculation units calculate derivatives of luminance components of images, and
   said apparatus further comprises a correction unit, arranged to correct a calculation result of said evaluation information calculation unit in accordance with a position of a pixel of interest in the original image.

8. The apparatus according to claim 7, wherein said correction unit makes correction to increase the calculation result of said evaluation information calculation unit when the position of the pixel of interest is near a central portion of the original image, and makes correction to decrease the calculation result of said evaluation information calculation unit as the position of the pixel of interest is closer to a peripheral portion in the original image.

9. The apparatus according to claim 1, further comprising a display unit, arranged to display as a visual image original image data, decoded image data, data sizes of the original image data and decoded image data and/or a compression ratio of the decoded image data, and a calculation result of the evaluation information calculation unit.

10. The apparatus according to claim 1, wherein the original image is each of frames which form a moving image, and said apparatus further comprises a unit, arranged to calculate evaluation information of each block on the basis of a calculation result of said evaluation information calculation unit and to adjust a quantization scale value of the corresponding block of the next frame.

11. The apparatus according to claim 1, wherein the encoding parameter is a quantization scale value.

12. The apparatus according to claim 1, wherein the original image is each of frames which form a moving image, and said apparatus further comprises a unit, arranged to calculate evaluation information of each block on the basis of a calculation result of said evaluation information calculation unit and to determine frequency characteristics of a low-pass filter for the corresponding block in the next frame.

13. An image processing method for generating information required to evaluate image quality of a decoded image expressed by code data, which is obtained by compression-encoding original image data based on a set encoding parameter, comprising:
   an encoding step of compression-encoding the original image data in accordance with a given encoding parameter;
   a decoding step of generating decoded image data by decoding encoded data obtained in the encoding step;
   a first spatial derivative calculation step of making a spatial derivative calculation of the original image data;
   a second spatial derivative calculation step of making a spatial derivative calculation of the decoded image data; and
   an evaluation information calculation step of calculating evaluation information, used as an index of block distortion of the image encoded in the encoding step, on the basis of results obtained in the first and second spatial derivative calculation steps.

14. A computer-readable medium encoded with a computer program serving as image processing for generating information required to evaluate image quality of a decoded image expressed by code data, which is obtained by compression-encoding original image data based on a set encoding parameter, said program functioning as:

an encoding unit, arranged to compression-encode the original image data in accordance with a given encoding parameter;

a decoding unit, arranged to generate decoded image data by decoding encoded data obtained by said encoding unit;

a first spatial derivative calculation unit, arranged to make a spatial derivative calculation of the original image data;

a second spatial derivative calculation unit, arranged to make a spatial derivative calculation of the decoded image data; and an evaluation information calculation unit, arranged to calculate evaluation information, used as an index of block distortion of the image encoded by said encoding unit, on the basis of results obtained by said first and second spatial derivative calculation units.

* * * * *